United States Patent
Cao et al.

(10) Patent No.: US 11,327,789 B2
(45) Date of Patent: May 10, 2022

(54) MERGED INPUT/OUTPUT OPERATIONS FROM A PLURALITY OF VIRTUAL MACHINES

(71) Applicant: Intel Corporation, Santa Clara, CA (US)

(72) Inventors: Gang Cao, Shanghai (CN); Weihua Rosen Xu, Shanghai (CN); Danny Yigang Zhou, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 16/478,549

(22) PCT Filed: Feb. 17, 2017

(86) PCT No.: PCT/CN2017/073949
§ 371 (c)(1),
(2) Date: Jul. 17, 2019

(87) PCT Pub. No.: WO2018/148934
PCT Pub. Date: Aug. 23, 2018

(65) Prior Publication Data
US 2020/0050480 A1 Feb. 13, 2020

(51) Int. Cl.
*G06F 9/48* (2006.01)
*G06F 9/455* (2018.01)
(Continued)

(52) U.S. Cl.
CPC ........ *G06F 9/4881* (2013.01); *G06F 9/45558* (2013.01); *G06F 13/1668* (2013.01);
(Continued)

(58) Field of Classification Search
None
See application file for complete search history.

(56) References Cited

U.S. PATENT DOCUMENTS 8,769,270 B2 * 7/2014 Orsini ................... H04L 9/0861
713/165
8,843,933 B1 * 9/2014 Holler ................. G06F 9/45533
718/104
(Continued)

FOREIGN PATENT DOCUMENTS

| CN | 103634379 A | 3/2014 |
|---|---|---|
| CN | 104809124 A | 7/2015 |
| WO | 2018148934 A1 | 8/2018 |

OTHER PUBLICATIONS

Menglei et al. "FPGA Design of onboard queue management equipment based on occupancy", 2011 IEEE, pp. 1111-1114.*
(Continued)

*Primary Examiner* — Nan H Nguyen
(74) *Attorney, Agent, or Firm* — Patent Capital Group

(57) ABSTRACT

In an example, there is disclosed a computing apparatus, having: a data interface to communicatively couple to a storage pool having a plurality of disks; a virtual machine manager including a processor; and a storage coprocessor (SCP) to: create a read queue and write queue for the disks in the storage pool; receive an input/output (IO) operation from a virtual machine, the IO operation directed to a storage address located on a disk in the storage pool; and add the IO operation to the queue for the disk.

23 Claims, 12 Drawing Sheets

(51) Int. Cl.
 *G06F 13/16* (2006.01)
 *H04L 67/1097* (2022.01)
(52) U.S. Cl.
 CPC .............. *G06F 2009/45579* (2013.01); *G06F 2009/45583* (2013.01); *H04L 67/1097* (2013.01)

(56) References Cited

U.S. PATENT DOCUMENTS

| | | | |
|---|---|---|---|
| 9,823,849 B2* | 11/2017 | Schmisseur | G06F 3/0685 |
| 2006/0195663 A1* | 8/2006 | Arndt | G06F 3/0605 |
| | | | 711/153 |
| 2011/0292792 A1 | 12/2011 | Zuo et al. | |
| 2012/0072723 A1* | 3/2012 | Orsini | H04L 63/10 |
| | | | 713/165 |
| 2013/0305246 A1* | 11/2013 | Goggin | H04L 47/783 |
| | | | 718/1 |
| 2014/0301197 A1 | 10/2014 | Birke et al. | |
| 2016/0314017 A1* | 10/2016 | Zhang | G06F 9/5011 |
| 2018/0088978 A1* | 3/2018 | Li | G06F 13/28 |

OTHER PUBLICATIONS

Feng et al. "Virtual Disk Reconfiguration with Performance Guarantees in Shared Storage Environment", 2005 IEEE, 6 pages.*
PCT International Search Report and Written Opinion issued in PCT/CN2017/073949 dated Nov. 22, 2017; 11 pages.

* cited by examiner

MERGED INPUT/OUTPUT OPERATIONS FROM A PLURALITY OF VIRTUAL MACHINES

This application is a national stage application under 35 U.S.C. § 371 of PCT International Application Serial No. PCT/CN2017/073949, filed Feb. 17, 2017, titled "MERGED INPUT/OUTPUT OPERATIONS." The disclosure of this prior application is considered part of (and is incorporated by reference in) the disclosure of this application.

FIELD OF THE SPECIFICATION

This disclosure relates in general to the field of cloud computing, and more particularly, though not exclusively to, a system and method for merged input/output operations.

BACKGROUND

Contemporary computing practice has moved away from hardware-specific computing and toward "the network is the device." A contemporary network may include a datacenter hosting a large number of generic hardware server devices, contained in a server rack, for example, and controlled by a hypervisor. Each hardware device may run one or more instances of a virtual device, such as a workload server or virtual desktop.

In some cases, a virtualized network may also include network function virtualization (NFV), which provides certain network functions as virtual appliances. These functions may be referred to as virtual network functions (VNFs). In the past, the functions provided by these VNFs may have been provided by bespoke hardware service appliances.

Thus, in a contemporary "cloud" architecture, both network endpoints and network infrastructure may be at least partially provided in a virtualization layer.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1A:
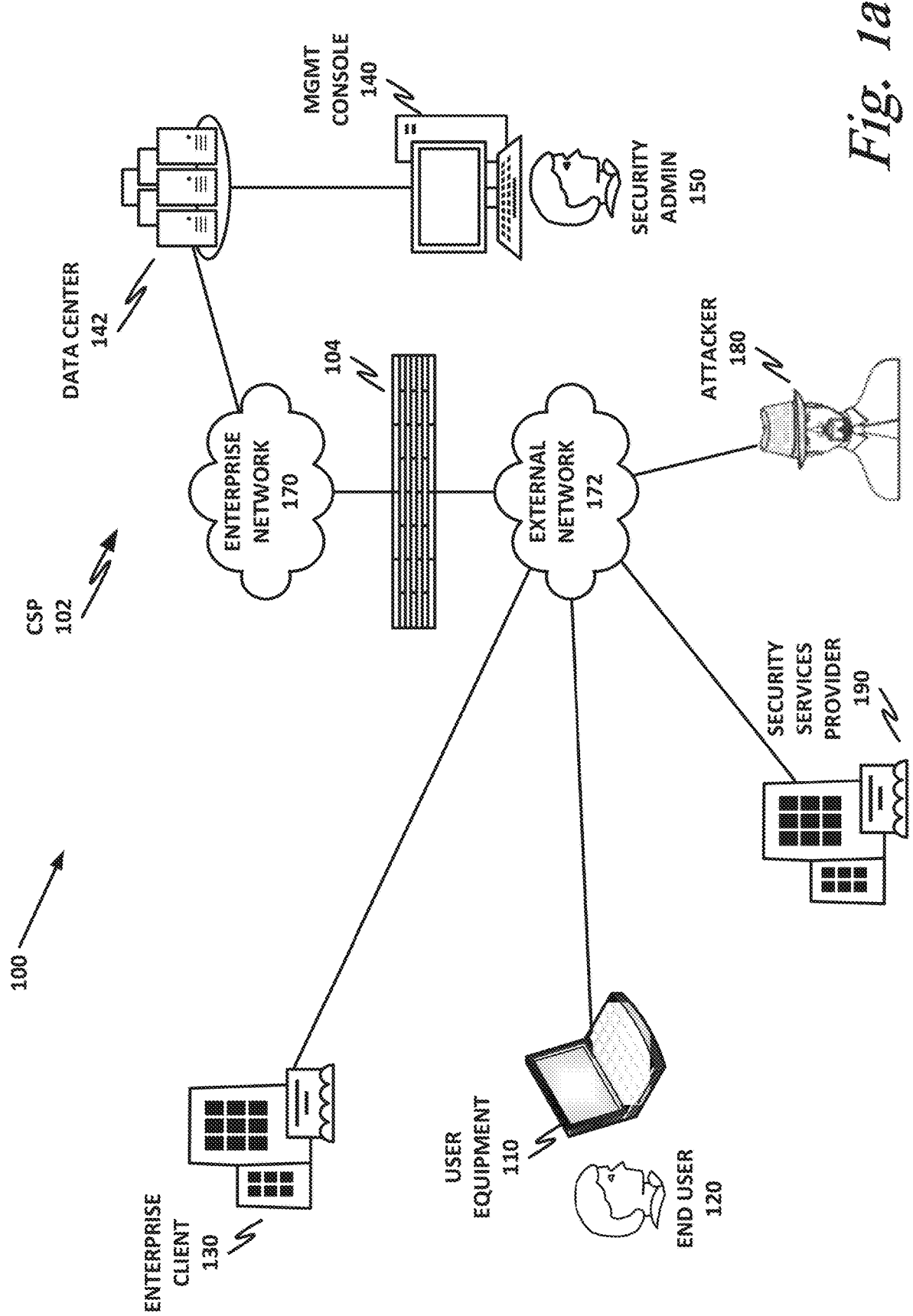
FIG. 1a is a block diagram of a network according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Cloud computing realizes both advantages and challenges for service providers and clients. One of these advantages is flexibility of storage. For example, in a classic hardware architecture, a computer had one or more hard drives, which had a fixed and immutable size. Hard drives could be partitioned or divided, but the only way to change the available storage space for the hard drive was to replace it with another physical hard drive.

In a virtual computing environment, there is much more flexibility, sometimes referred to as "elasticity." This may include elastic networks, elastic compute resources, and elastic storage. In other words, many different kinds of resources may be dynamically provisioned as they are needed, rather than "overbuilding" resources to meet hypothetical future demand that may or may not be actually realized.

Thus, a virtual machine (VM) is provisioned with a virtual drive (VD), which has a nominal size. But the nominal size may, in fact, be simply a currently-defined maximum size of disk allocation. This VD may be providing, for example, a database or real-time analytics, the size of which can be highly dynamic over time. For example, a VM may have a virtual disk with a nominal size of 100 gigabytes (GB), meaning that up to 100 GB may be dynamically allocated to that VM from a storage pool. As more of the disk is "used," more storage space is dynamically allocated.

Furthermore, the nominal size of a disk need not be fixed. If a VM with a 100 GB nominal VD finds that its current allocation is insufficient, it is possible to increase the nominal size of the VD, such as to 250 GB. The low-level details of which storage blocks are allocated on which disk are not visible to the VM and need not be. Rather, those details may be handled by a storage controller attached to the hypervisor or virtual machine manager (VMM) that "owns" the VM.

While this flexibility is advantageous, it does present some challenges. For example, if a VD has a nominal size of 250 GB, but is currently using only 100 GB, those 100

GB of data may be allocated to a block of storage on a first physical disk with 1 TB capacity. That block may also host storage for other VDs. If the actual usage of the VD increase to 200 GB, there may be insufficient room on the first physical disk to contain the new data. So, the data will need to be hosted on a second physical disk. While this is not a problem for a well-configured cloud environment, some inefficiencies may arise.

Two benefits of an elastic cloud architecture include the flexibility to scale up and scale down resources on demand, and consistent low-latency performance, which may in fact be guaranteed by contract as a Quality of Service (QoS) or service level agreement (SLA) metric.

But these two benefits of elasticity may be in tension with each other. For example, as an application scales up its storage space, it may be required to have the same level of input/output (IO) performance. Normally in an elastic cloud environment, applications run on a single VM, which shares the network, compute, and storage resources managed by the VMM or hypervisor. To provide scale-up and scale-down flexibility, the VMM may allocate storage blocks in relatively small, fixed, fine-grained units, such as 4 kilobytes (4 KB). A large storage allocation will include hundreds, thousands, or millions of such allocations. Ideally, all of these blocks would be contiguously allocated on a single disk. This can be realized if the maximum size of the disk is reserved on a single physical device, but this defeats a benefit of elasticity—the storage pool must be over-built to account for the maximum possible size of every disk. And if a VM is able to dynamically re-allocate the nominal size of its VD, an additional margin needs to be built in for this possibility.

To truly preserve elasticity, it is thus inevitable that the storage allocated for the different VDs will be spread across different discrete physical devices. And when a disk access involves issuing IO operations to numerous physical devices, IO overhead increases, thus defeating the low-latency potential of the cloud architecture.

The storage managed by the VMM may generally include many backend physical devices grouped into a large resource pool. Within each VM, the application read/writes may be relatively contiguous or relatively random. However, for an individual storage device, hosting storage for many different VMs, the stream of IO operations may be highly random (i.e., noncontiguous), and may include a large number of small, uncorrelated reads and writes.

While some existing cloud architectures address the latency issue by identifying specific VMs that receive special queueing priority, further advantages can be realized by providing a generalized queueing solution that lowers latency for all VM. For example, in one embodiment, a storage coprocessor (SCP), which may be, for example, a field-programmable gate array (FPGA) or application-specific integrated circuit (ASIC), can be provisioned with the VMM. The SCP can allocate a read queue and write queue for each physical disk in the storage pool. Read and write requests can be aggregated into the queues, and when the queue for a disk is full, the operations stored in the queue are flushed. Thus, for example, a number of small write operations can be queued by the SCP, and can then be sent to the target disk as a single batch. This can alleviate the overhead incurred by issuing a large number of separate IO operations to the disk.

In an embodiment, a timeout may also be defined for each queue. If the timeout expires without a flush, the queue may be immediately flushed, thus ensuring that the queue itself does not become a performance bottleneck.

Advantageously, the size of each queue is configurable, and can be automatically optimized by the SCP responsive to the capabilities and requirements of each disk.

This disclosure leverages the SCP to aggregate and handle IOs from all VMs as a whole, instead of operating on IOs from VMs individually. The parent IO operations from one VM may break down into several real "sub-IOs" on the physical device based on the fine-grained space management by VMM. With an SCP, particularly a high-speed FPGA or ASIC, the IO operations can be handled quickly and with awareness of the preferred size for each storage device.

In operation, the SCP may create the read and write queues for each physical device, and then receive the real sub-IOs from the VMs on a non-discriminating basis. In fact, the SCP need not be aware of the parent IO operations that provided each sub-IO. Newly-arriving IOs are merged into a single larger IO, whose size is intelligently configured by the SCP based on each device's properties (e.g., preferred block size, a solid state drive (SSD)'s endurance, and amplification). The SCP merges the sub-IOs by linking continuous or overlapping IOs, and then inserting zeroes for adjacent IOs. The SCP may also pad the overall buffer with appended zeroes to fill out its designated size. The buffer is then sent to the storage device's hardware queue to perform the actual IO operation.

Advantageously, the use of a dedicated SCP can provide offloading of many CPU interactions with the storage pool. For example, the SCP can autonomously optimize for the write endurance of an SSD, the block size of a particular device, or for write and space amplification for a specific device. Thus, performance improvements (particularly with regard to IO latency) are realized not only on an individual VM, but across the datacenter.

The foregoing structure and method improve IO performance for all VMs sharing a single physical device pool, managed by a VMM with an appropriate attached SCP. Thus, the advantages of an elastic cloud architecture, including both flexibility and low latency, can be simultaneously achieved.

A system and method for merged input/output operations will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1*a* is a network-level diagram of a network 100 of a cloud service provider (CSP) 102 according to one or more examples of the present specification. In the example of FIG. 1*a*, network 100 may be configured to enable one or more enterprise clients 130 to provide services or data to one or more end users 120, who may operate user equipment 110 to access information or services via external network 172. This example contemplates an embodiment in which a cloud service provider 102 is itself an enterprise that provides third-party "network as a service" (NaaS) to enterprise client 130. However, this example is nonlimiting. Enterprise client 130 and CSP 102 could also be the same or a related entity in appropriate embodiments.

Enterprise network 170 may be any suitable network or combination of one or more networks operating on one or more suitable networking protocols, including, for example, a fabric, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within datacenter 142. In this illustration, enterprise network 170 is shown as a single network for simplicity, but in some embodiments, enterprise network 170 may include a large number of networks, such as one or more enterprise intranets connected to the Internet, and may include datacenters in a plurality of geographic locations. Enterprise network 170 may also provide access to an external network, such as the Internet, via external network 172. External network 172 may similarly be any suitable type of network.

A datacenter 142 may be provided, for example as a virtual cluster running in a hypervisor on a plurality of rackmounted blade servers, or as a cluster of physical servers. Datacenter 142 may provide one or more server functions, one or more VNFs, or one or more "microclouds" to one or more tenants in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors. In some embodiments, datacenter 142 may also provide multitenancy, in which a single instance of a function may be provided to a plurality of tenants, with data for each tenant being insulated from data for each other tenant.

It should also be noted that some functionality of user equipment 110 may also be provided via datacenter 142. For example, one microcloud may provide a remote desktop hypervisor such as a Citrix workspace, which allows end users 120 to remotely login to a remote enterprise desktop and access enterprise applications, workspaces, and data. In that case, UE 110 could be a "thin client" such as a Google Chromebook, running only a stripped-down operating system, and still provide user 120 useful access to enterprise resources.

One or more computing devices configured as a management console 140 may also operate on enterprise network 170. Management console 140 may be a special case of user equipment, and may provide a user interface for a security administrator 150 to define enterprise security and network policies, which management console 140 may enforce on enterprise network 170 and across client devices 110 and datacenter 142. In an example, management console 140 may run a server-class operating system, such as Linux, Unix, or Windows Server. In another case, management console 140 may be provided as a web interface, on a desktop-class machine, or via a VM provisioned within datacenter 142.

Network 100 may communicate across enterprise boundary 104 with external network 172. Enterprise boundary 104 may represent a physical, logical, or other boundary. External network 172 may include, for example, websites, servers, network protocols, and other network-based services. CSP 102 may also contract with a third-party security services provider 190, such as McAfee® or another security services enterprise, to provide security services to network 100.

It may be a goal of enterprise clients to securely provide network services to end users 120 via datacenter 142, as hosted by CSP 102. To that end, CSP 102 may provide certain contractual quality of service (QoS) guarantees and/or service level agreements (SLA). QoS may be a measure of resource performance, and may include factors such as availability, jitter, bit rate, throughput, error rates, and latency, to name just a few. An SLA may be a contractual agreement that may include QoS factors, as well as factors such as "mean time to recovery" (MTTR) and mean time between failure (MTBF). In general, an SLA may be a higher-level agreement that is more relevant to an overall experience, whereas QoS may be used to measure the performance of individual components. However, this should not be understood as implying a strict division between QoS metrics and SLA metrics.

Figure 1B:
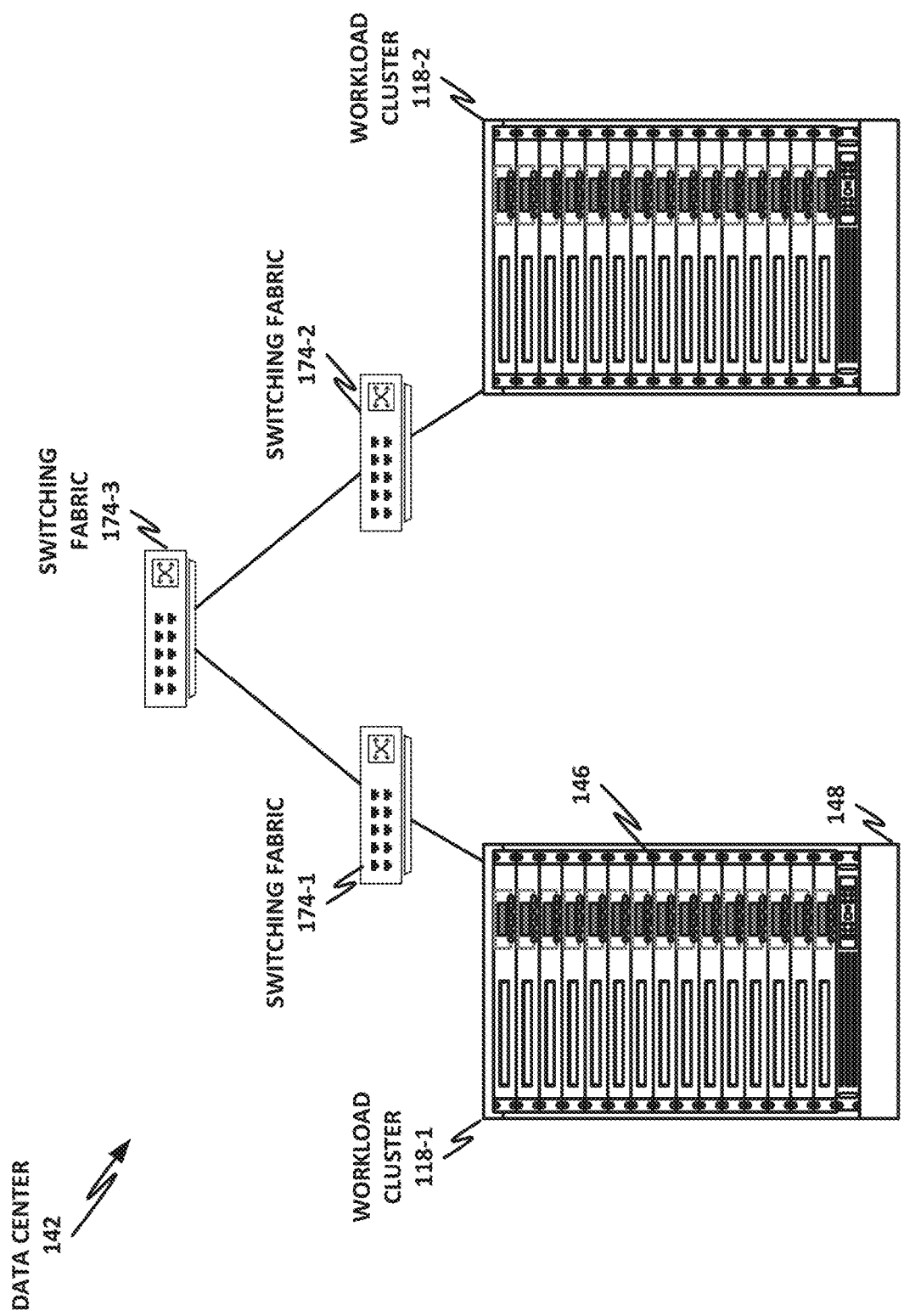
FIG. 1b is a block diagram of selected components of a datacenter in the network.

Turning to FIG. 1b, to meet contractual QoS and SLA requirements, CSP 102 may provision some number of workload clusters 118. In this example, two workload clusters, 118-1 and 118-2 are shown, each providing up to 16 rackmount servers 146 in a chassis 148. These server racks may be collocated in a single datacenter, or may be located in different geographic datacenters. Depending on the contractual agreements, some servers 146 may be specifically dedicated to certain enterprise clients or tenants, while others may be shared.

Selection of a number of servers to provision in a datacenter is a nontrivial exercise for CSP 102. CSP 102 may wish to ensure that there are enough servers to handle network capacity, and to provide for anticipated device failures over time. However, provisioning too many servers 146 can be costly both in terms of hardware cost, and in terms of power consumption. Thus, Ideally, CSP 102 provisions enough servers 146 to service all of its enterprise clients 130 and meet contractual QoS and SLA benchmarks, but not have wasted capacity.

The various devices in datacenter 142 may be connected to each other via a switching fabric 174, which may include one or more high speed routing and/or switching devices. In some cases, switching fabric 174 may be hierarchical, with, for example, switching fabric 174-1 handling workload cluster 118-1, switching fabric 174-2 handling workload cluster 118-2, and switching fabric 174-3. This simple hierarchy is shown to illustrate the principle of hierarchical switching fabrics, but it should be noted that this may be significantly simplified compared to real-life deployments. In many cases, the hierarchy of switching fabric 174 may be multifaceted and much more involved. Common network architectures include hub-and-spoke architectures, and leaf-spine architectures.

The fabric itself may be provided by any suitable interconnect, such as Intel® OmniPath™, TrueSacle™, Ultra Path Interconnect (UPI) (formerly called QPI or KTI), STL, Ethernet, PCI, or PCIe, to name just a few. Some of these will be more suitable for certain types of deployments than others, and selecting an appropriate fabric for the instant application is an exercise of ordinary skill.

Figure 2:
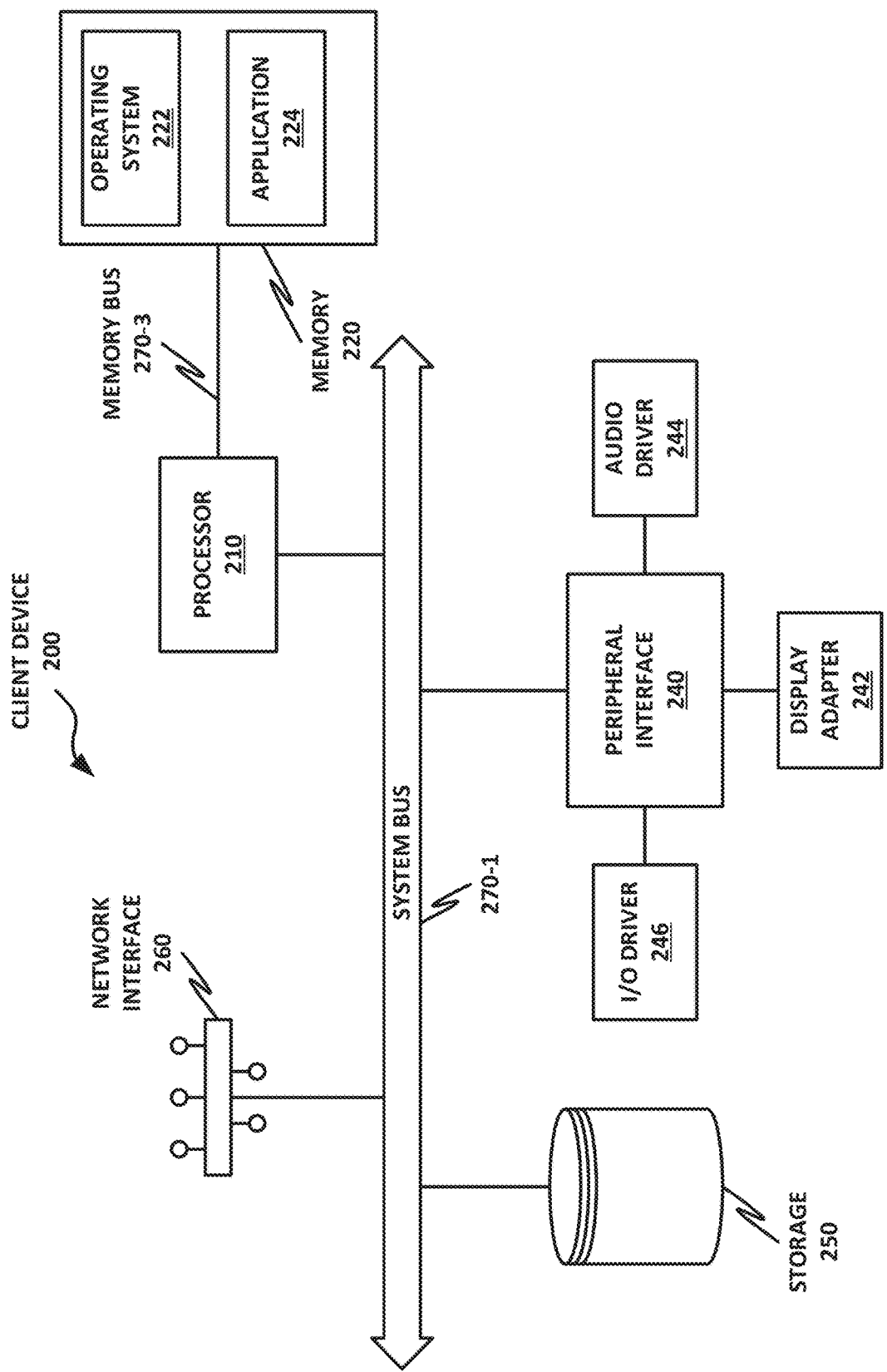
FIG. 2 is a block diagram of selected components of an end-user computing device according to one or more examples of the present specification.

FIG. 2 is a block diagram of client device 200 according to one or more examples of the present specification. Client device 200 may be any suitable computing device. In various embodiments, a "computing device" may be or comprise, by way of nonlimiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host." In particular, user equipment 110 may be a client device 200, and in one particular example, client device 200 is a virtual machine configured for remote direct memory access (RDMA), as described herein.

Client device 200 includes a processor 210 connected to a memory 220, having stored therein executable instructions for providing an operating system 222 and at least software portions of an application 224. Other components of client device 200 include a storage 250, network interface 260, and peripheral interface 240. This architecture is provided by way of example only, and is intended to be nonexclusive and nonlimiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices, such as in the case of a datacenter storage pool or memory server. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block.

As used throughout this specification, "logic elements" may include hardware (including, for example, a programmable software, ASIC, or FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, nontransitory computer-readable medium having stored thereon executable instructions for instructing a processor to perform a certain task. Such a nontransitory medium could include, for example, a hard disk, solid state memory or disk, read-only memory (ROM), persistent fast memory (PFM) (e.g., Intel® 3D Crosspoint), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

In an example, processor 210 is communicatively coupled to memory 220 via memory bus 270-3, which may be a direct memory access (DMA) bus, by way of example. However, other memory architectures are possible, including ones in which memory 220 communicates with processor 210 via system bus 270-1 or some other bus. In datacenter environments, memory bus 270-3 may be, or may include, the fabric.

Processor 210 may be communicatively coupled to other devices via a system bus 270-1. As used throughout this specification, a "bus" Includes any wired or wireless interconnection line, network, connection, fabric, bundle, single bus, multiple buses, crossbar network, single-stage network, multistage network, or other conduction medium operable to carry data, signals, or power between parts of a computing device, or between computing devices. It should be noted that these uses are disclosed by way of nonlimiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including, by way of nonlimiting example, a microprocessor, digital signal processor (DSP), field-programmable gate array (FPGA), graphics processing unit (GPU), programmable logic array (PLA), application-specific integrated circuit (ASIC), or virtual machine processor. In certain architectures, a multicore processor may be provided, in which case processor 210 may be treated as only one core of a multicore processor, or may be treated as the entire multicore processor, as appropriate. In some embodiments, one or more coprocessors may also be provided for specialized or support functions.

Processor 210 may be connected to memory 220 in a DMA configuration via bus 270-3. To simplify this disclosure, memory 220 is disclosed as a single logical block, but in a physical embodiment may include one or more blocks of any suitable volatile or nonvolatile memory technology or technologies, including, for example, double date rate random access memory (DDR RAM), static random access memory (SRAM), dynamic random access memory (DRAM), persistent fast memory (PFM) (such as Intel® 3D Crosspoint (3DXP)), cache, L1 or L2 memory, on-chip memory, registers, flash, read-only memory (ROM), optical media, virtual memory regions, magnetic or tape memory, or similar. Memory 220 may be provided locally, or may be provided elsewhere, such as in the case of a datacenter with a 3DXP memory server. In certain embodiments, memory 220 may comprise a relatively low-latency volatile main memory, while storage 250 may comprise a relatively higher-latency nonvolatile memory. However, memory 220 and storage 250 need not be physically separate devices, and in some examples may represent simply a logical separation of function. These lines can be particularly blurred in cases where the only long-term memory is a batter-backed RAM, or where the main memory is provided as PFM. It should also be noted that although DMA is disclosed by way of nonlimiting example, DMA is not the only protocol consistent with this specification, and that other memory architectures are available.

Operating system 222 may be provided, though it is not necessary in all embodiments. For example, some embedded systems operate on "bare metal" for purposes of speed, efficiency, and resource preservation. However, in contemporary systems, it is common for even minimalist embedded systems to include some kind of operating system. Where it is provided, operating system 222 may include any appropriate operating system, such as Microsoft Windows, Linux, Android, Mac OSX, Apple iOS, Unix, or similar. Some of the foregoing may be more often used on one type of device than another. For example, desktop computers or engineering workstations may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. Embedded devices often use an embedded Linux or a dedicated embedded OS such as VxWorks. However, these examples are not intended to be limiting.

Storage 250 may be any species of memory 220, or may be a separate nonvolatile memory device. Storage 250 may include one or more nontransitory computer-readable mediums, including by way of nonlimiting example, a hard drive, solid-state drive, external storage, redundant array of independent disks (RAID), redundant array of independent nodes (RAIN), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of application 224. In some examples, storage 250 may be a nontransitory computer-readable storage medium that includes hardware instructions or logic encoded as processor instructions or on an ASIC. Many other configurations are also possible, and are intended to be encompassed within the broad scope of this specification.

Network interface 260 may be provided to communicatively couple client device 200 to a wired or wireless network. A "network," as used throughout this specification, may include any communicative platform or medium operable to exchange data or information within or between computing devices, including, by way of nonlimiting example, Ethernet, WiFi, a fabric, an ad-hoc local network, an Internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment. Note that in certain embodiments, network interface 260 may be, or may include, a host fabric interface (HFI).

Application 224, in one example, is operable to carry out computer-implemented methods as described in this specification, including performing functions that require disk access. As described above, these parent IOs may be routed via a hypervisor to a storage pool, where they are translated into actual IO operations on a physical disk. Application 224 may include one or more tangible nontransitory computer-readable mediums having stored thereon executable instructions operable to instruct a processor to provide an application 224. Application 224 may also include a processor, with corresponding memory instructions that instruct the processor to carry out the desired method. As used throughout this specification, an "engine" includes any combination of one or more logic elements, of similar or dissimilar species, operable for and configured to perform one or more methods or functions of the engine. In some cases, application 224 may include a special integrated circuit designed to carry out a method or a part thereof, and may also include software instructions operable to instruct a processor to perform the method. In some cases, application 224 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, basic input/output system (BIOS) subroutine, or any similar program that operates without direct user interaction. In certain embodiments, daemon processes may run with elevated privileges in a "driver space" associated with ring 0, 1, or 2 in a protection ring architecture. It should also be noted that application 224 may also include other hardware and software, including configuration files, registry entries, and interactive or user-mode software by way of nonlimiting example.

In one example, application 224 includes executable instructions stored on a nontransitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of application 224 to provide the desired method.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of nonlimiting example.

In one example, peripherals include display adapter 242, audio driver 244, and input/output (IO) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of nonlimiting example. Note that in embodiments where client device 200 is a virtual machine, peripherals may be provided remotely by a device used to access the virtual machine.

Figure 3:
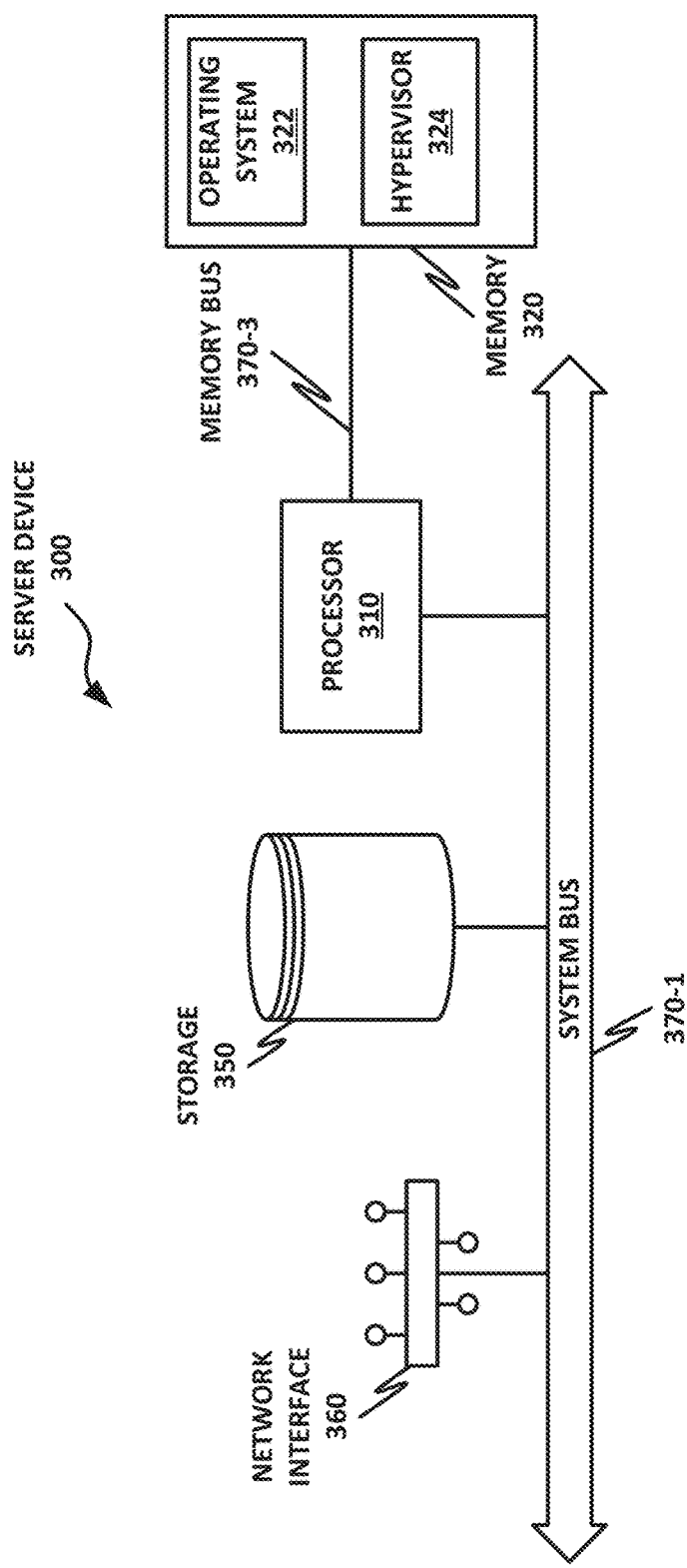
FIG. 3 is a high-level block diagram of a server according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations may be divided along a client-server model, wherein client device 200 provides certain localized tasks, while server 300 provides certain other centralized tasks.

Note that server 300 of FIG. 3 illustrates, in particular, the classic "Von Neumann Architecture" aspects of server 300, with a focus on functional blocks. Other FIGURES herein (e.g., FIGS. 4a, 4b, and 5 below) may illustrate other aspects of a client or server device, with more focus on virtualization aspects. These illustrated embodiments are not intended to be mutually exclusive or to infer a necessary distinction. Rather, the various views and diagrams are intended to illustrate different perspectives and aspects of these devices.

In a particular example, server device 300 may be a memory server as illustrated herein.

Server 300 includes a processor 310 connected to a memory 320, having stored therein executable instructions for providing an operating system 322 and at least software portions of a memory hypervisor 324. Other components of server 300 include a storage 350, and host fabric interface 360. As described in FIG. 2, each logical block may be provided by one or more similar or dissimilar logic elements.

In an example, processor 310 is communicatively coupled to memory 320 via memory bus 370-3, which may be, for example, a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type. Memory 320 may include a persistent fast memory, such as 3DXP or similar.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of memory hypervisor 324.

Host fabric interface 360 may be provided to communicatively couple server 300 to a wired or wireless network, including a host fabric. A host fabric may include a switched interface for communicatively coupling nodes in a cloud or cloud-like environment. HFI 360 is used by way of example here, though any other suitable network interface (as discussed in connection with network interface 260) may be used.

Memory hypervisor 324 is an engine as described in FIG. 2 and, in one example, includes one or more logic elements operable to carry out computer-implemented methods as described in this specification. Software portions of memory hypervisor 324 may run as a daemon process.

Memory hypervisor 324 may include one or more non-transitory computer-readable mediums having stored thereon executable instructions operable to instruct a processor to provide memory hypervisor 324. At an appropriate time, such as upon booting server 300 or upon a command from operating system 322 or a user 120 or security administrator 150, processor 310 may retrieve a copy of memory hypervisor 324 (or software portions thereof) from storage 350 and load it into memory 320. Processor 310 may then iteratively execute the instructions of memory hypervisor 324 to provide the desired method.

Figure 4A:
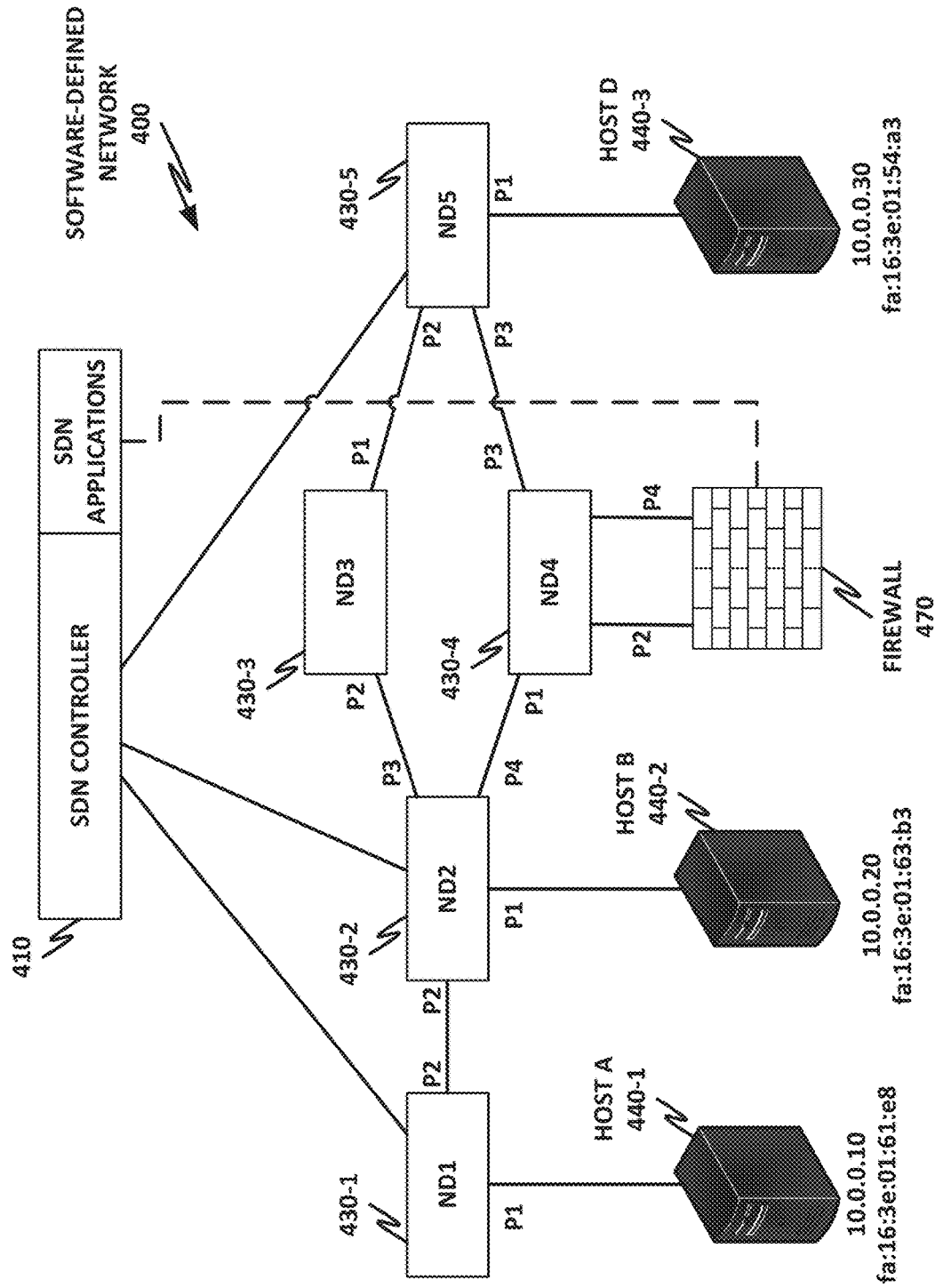
FIG. 4a is a block diagram of software-defined networking (SDN) according to one or more examples of the present specification.

FIG. 4a is a block diagram of a software-defined network 400. In software defined networking (SDN), a data plane is separated from a control plane to realize certain advantages. SDN is only one flavor of virtualization, shown here to illustrate one option for a network setup.

Figure 4B:
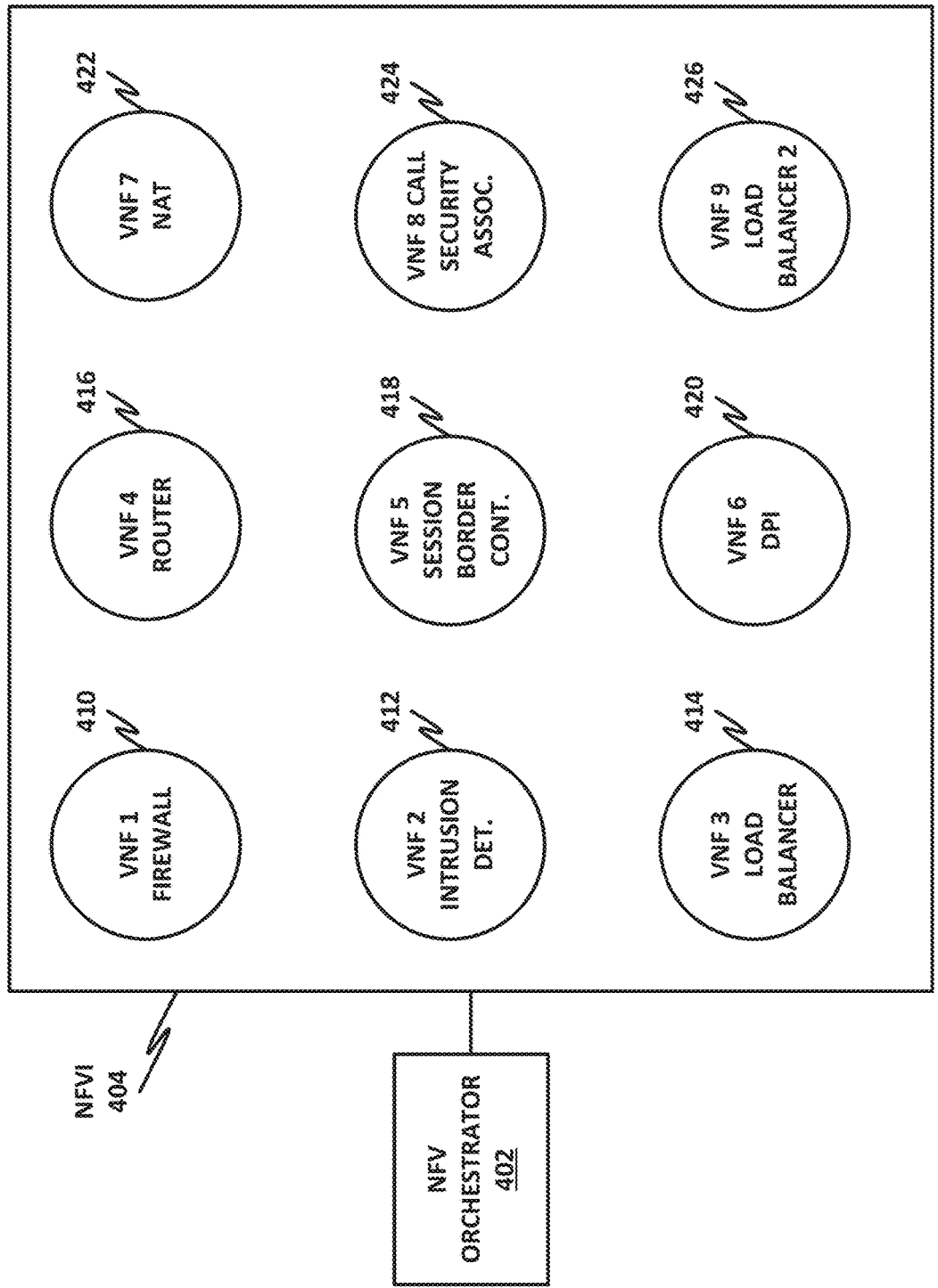
FIG. 4b is a block diagram of network function virtualization (NFV) according to one or more examples of the present specification.

Network function virtualization, illustrated in FIG. 4b, is a second nonlimiting flavor of network virtualization, often treated as an add-on or improvement to SDN, but sometimes treated as a separate entity. NFV was originally envisioned as a method for providing reduced capital expenditure (Capex) and operating expenses (Opex) for telecommunication services, which relied heavily on fast, single purpose service appliances. One important feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancer VNFs may be spun up to distribute traffic to more workload servers (which may themselves be virtual machines). In times where more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI). Often, the VNFs are in-line service functions that are separate from workload servers or other nodes (in many cases, workload-type functions were long since virtualized). These VNFs can be chained together into a service chain, which may be defined by a virtual subnetwork, and which may include a serial string of network services that provide behind-the-scenes work, such as security, logging, billing, and similar. In one example, an incoming packet passes through a chain of services in a service chain, with one or more of the services being provided by a VNF, whereas historically each of those functions may have been provided by bespoke hardware in a physical service appliance. Because NFVs can be spun up and spun down to meet demand, the allocation of hardware and other resources can be made more efficient. Processing resources can be allocated to meet the greatest demand, whereas with physical service appliances, any unused capacity on an appliance is simply wasted, and increasing capacity to meet demand required plugging in a physical (expensive) bespoke service appliance.

The illustrations of FIGS. 4a and 4b may be considered more functional, while in comparison the illustration of FIG. 1 may be more of a high-level logical layout of the network. It should be understood, however, that SDN 400 (FIG. 4a), NFVI 404 (FIG. 4b), and enterprise network 100 may be the same network, or may be separate networks.

In FIG. 4a, SDN 400 may include an SDN controller 410, a plurality of network devices 430, and a plurality of host devices 440. Some or all of SDN controller 410, network devices 430, and host devices 440 may be embodied within workload cluster 142 of FIG. 1, or may otherwise form a part of enterprise network 170.

SDN 400 is controlled by an SDN controller 410. SDN controller 410 is communicatively coupled to a plurality of network devices 430. Specifically, ND1 430-1, ND2 430-2, and ND5 430-5 are directly communicatively coupled to SDN controller 410. Network devices and ND3 430-3 and ND4 430-4 are not directly coupled to SDN controller 410, but rather coupled via the intermediate devices, such as ND2 430-2, and ND5 430-5.

Some network devices 430 also communicatively couple directly to host devices 440. Specifically, network device ND1 directly couples to host A 440-1, which has IP address 10.0.0.10, and MAC address FA:16:3:01:61:8. Network device ND2 430-2 directly couples to host B 440-2, which has IP address 10.0.0.20, and MAC address FA:16:3:01:63:B3. Network device ND5 430-5 directly couples to host D 440-3, which has IP address 10.0.0.30, and MAC address FA:16:3:01:54:83.

Network devices 430 may be configured to perform a variety of network functions, such as, by way of nonlimiting example, load-balancing, firewall, deep packet inspection (DPI), DNS, antivirus, or any other suitable network function. The particular arrangement of interconnections between network devices 430 and from network devices 430 to host devices 440 may be determined by the particular network configuration and needs. Thus, the specific configuration of FIG. 4a should be understood to be an illustrative example only.

Each network device 430 may have a plurality of ingress and or egress interfaces, such as physical Ethernet or fabric ports. In an example, each interface may have a label or new name, such as P1, P2, P3, P4, P5, and so on. Thus, certain aspects of the network layout can be determined by inspecting which devices are connected on which interface. For example, network device ND1 430-1 has an ingress interface for receiving instructions and communicating with SDN controller 410. ND1 430-1 also has an interface P1 communicatively coupled to host A 440-1. ND1 430-1 has interface P2 that is communicatively coupled to ND2 430-2. In the case of ND2 430-2, it also couples to ND1 430-1 on its own interface P2, and couples to host B 440-2 via interface P1. ND2 430-2 communicatively couples to intermediate devices ND3 430-3 and ND4 430-4 via interfaces P3 and P4 respectively. Additional interface definitions are visible throughout the figure.

A flow table may be defined for traffic as it flows from one interface to another. This flow table is used so that a network device, such as ND2 430-2 can determine, after receiving a packet, where to send it next.

For example, the following flow tables may be defined for ND1 430-1-ND4 430-4.

TABLE 1

ND1 Flow Rule

| Ingress I/F | Source MAC | Destination Mac | Source IP | Dest. IP | Action |
|---|---|---|---|---|---|
| P1 | ANY | fa:16:3e:01:54:a3 | ANY | 10.0.0.30 | P2 |

TABLE 2

ND2 Flow Rule

| Ingress I/F | Source MAC | Destination Mac | Source IP | Dest. IP | Action |
|---|---|---|---|---|---|
| P2 | ANY | fa:16:3e:01:54:a3 | ANY | 10.0.0.30 | P4 |

TABLE 3

ND3 Flow Rule

| Ingress I/F | Source MAC | Destination Mac | Source IP | Dest. IP | Action |
|---|---|---|---|---|---|
| P1 | ANY | fa:16:3e:01:54:a3 | ANY | 10.0.0.30 | P3 |

TABLE 4

ND4 Flow Rule

| Ingress I/F | Source MAC | Destination Mac | Source IP | Dest. IP | Action |
|---|---|---|---|---|---|
| P3 | ANY | fa:16:3e:01:54:a3 | ANY | 10.0.0.30 | P1 |

FIG. 4b is a block diagram of a network function virtualization (NFV) architecture according to one or more examples of the present specification. Like SDN, NFV is a subset of network virtualization. Thus, the network as illustrated in FIG. 4b may be defined instead of or in addition to the network of FIG. 4a. In other words, certain portions of the network may rely on SDN, while other portions (or the same portions) may rely on NFV.

In the example of FIG. 4b, an NFV orchestrator 402 manages a number of the VNFs running on in an NFVI 404. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus the need for NFV orchestrator 402.

Note that NFV orchestrator 402 itself is usually virtualized (rather than a special-purpose hardware appliance). NFV orchestrator 402 may be integrated within an existing SDN system, wherein an operations support system (OSS) manages the SDN. This may interact with cloud resource management systems (e.g., OpenStack) to provide NFV orchestration. There are many commercially-available, off-the-shelf, proprietary, and open source solutions for NFV orchestration and management (sometimes referred to as NFV MANO). In addition to NFV orchestrator 402, NFV MANO may also include functions such as virtualized infrastructure management (VIM) and a VNF manager.

An NFVI 404 may include the hardware, software, and other infrastructure to enable VNFs to run. This may include, for example, a rack or several racks of blade or slot servers (including, e.g., processors, memory, and storage), one or more datacenters, other hardware resources distributed across one or more geographic locations, hardware switches, network interfaces. An NFVI 404 may also include the software architecture that enables hypervisors to run and be managed by NFV orchestrator 402. NFVI 402 may include NFVI points of presence (NFVI-PoPs), where VNFs are deployed by the operator.

Running on NFVI 404 are a number of virtual machines, each of which in this example is a VNF providing a virtual service appliance. These include, as nonlimiting and illustrative examples, VNF 1 410, which is a firewall, VNF 2 412, which is an intrusion detection system, VNF 3 414, which is a load balancer, VNF 4 416, which is a router, VNF 5 418, which is a session border controller, VNF 6 420, which is a deep packet inspection (DPI) service, VNF 7 422, which is a network address translation (NAT) module, VNF 8 424, which provides call security association, and VNF 9 426, which is a second load balancer spun up to meet increased demand.

Firewall 410 is a security appliance that monitors and controls the traffic (both incoming and outgoing), based on matching traffic to a list of "firewall rules." Firewall 410 may be a barrier between a relatively trusted (e.g., internal) network, and a relatively untrusted network (e.g., the Internet). Once traffic has passed inspection by firewall 410, it may be forwarded to other parts of the network.

Intrusion detection 412 monitors the network for malicious activity or policy violations. Incidents may be reported to security administrator 150, or collected and analyzed by a security information and event management (SIEM) system. In some cases, intrusion detection 412 may also include antivirus or antimalware scanners.

Load balancers 414 and 426 may farm traffic out to a group of substantially identical workload servers to distribute the work in a fair fashion. In one example, a load balancer provisions a number of traffic "buckets," and assigns each bucket to a workload server. Incoming traffic is assigned to a bucket based on a factor, such as a hash of the source IP address. Because the hashes are assumed to be fairly evenly distributed, each workload server receives a reasonable amount of traffic.

Router 416 forwards packets between networks or subnetworks. For example, router 416 may include one or more ingress interfaces, and a plurality of egress interfaces, with each egress interface being associated with a resource, subnetwork, virtual private network, or other division. When traffic comes in on an ingress interface, router 416 determines what destination it should go to, and routes the packet to the appropriate egress interface.

Session border controller 418 controls voice over IP (VoIP) signaling, as well as the media streams to set up, conduct, and terminate calls. In this context, "session" refers to a communication event (e.g., a "call"). "Border" refers to a demarcation between two different parts of a network (similar to a firewall).

DPI appliance 420 provides deep packet inspection, including examining not only the header, but also the content of a packet to search for potentially unwanted content (PUC), such as protocol non-compliance, malware, viruses, spam, or intrusions.

NAT module 422 provides network address translation services to remap one IP address space into another (e.g., mapping addresses within a private subnetwork onto the larger Internet).

Call security association 424 creates a security association for a call or other session (see session border controller 418 above). Maintaining this security association may be critical, as the call may be dropped if the security association is broken.

The illustration of FIG. 4 shows that a number of VNFs have been provisioned and exist within NFVI 404. This figure does not necessarily illustrate any relationship between the VNFs and the larger network.

Figure 5:
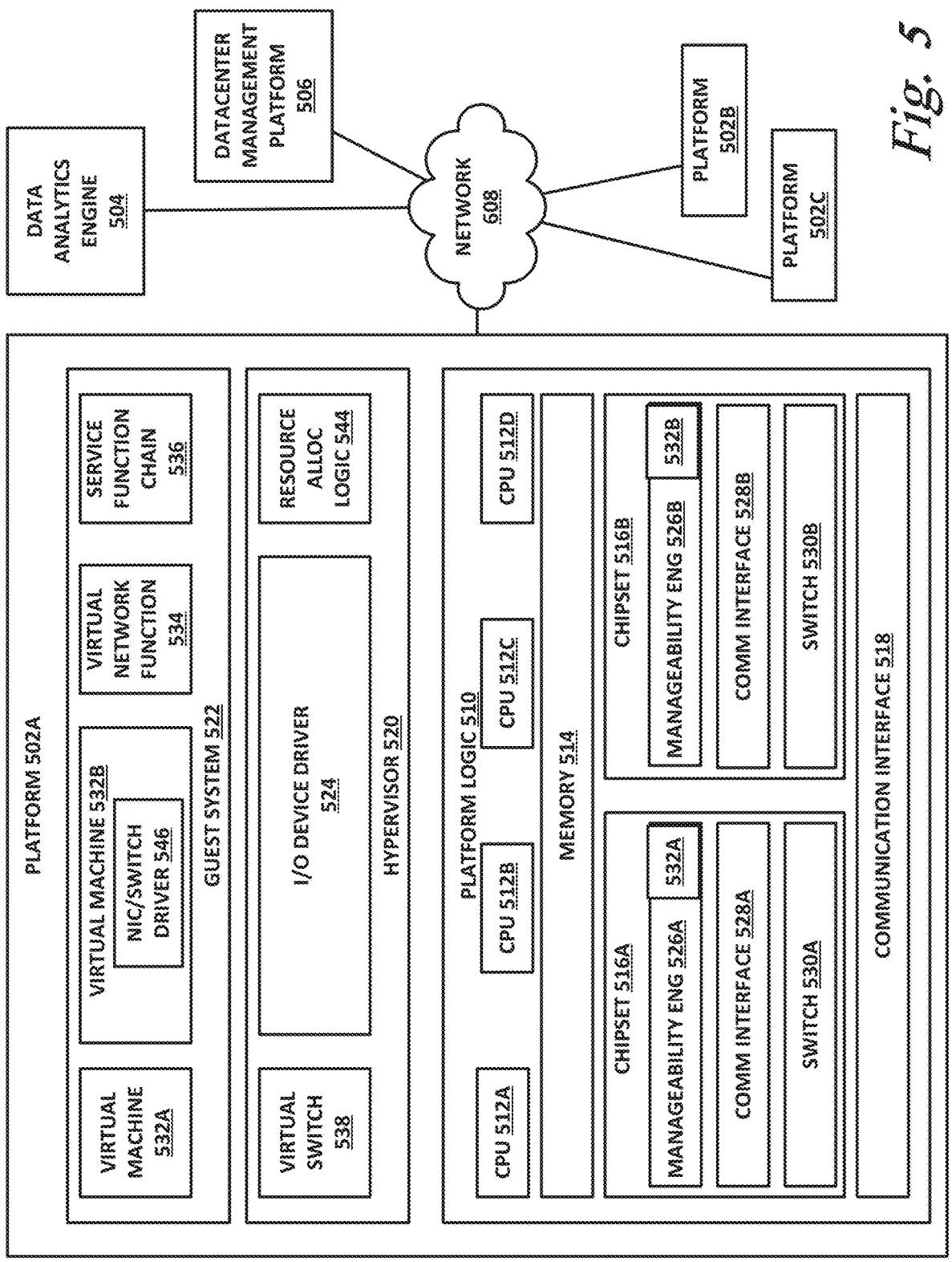
FIG. 5 is a block diagram of a platform architecture according to one or more examples of the present specification.

FIG. 5 illustrates a block diagram of components of a computing platform 500 according to one or more examples of the present specification. In the embodiment depicted, computer platform 500 includes a plurality of platforms 502 and system management platform 506 coupled together through network 508. In other embodiments, a computer system may include any suitable number of (i.e., one or more) platforms. In some embodiments (e.g., when a computer system only includes a single platform), all or a portion of the system management platform 506 may be included on a platform 502. A platform 502 may include platform logic 510 with one or more central processing units (CPUs) 512, memories 514 (which may include any number of different modules), chipsets 516, communication interfaces 518, and any other suitable hardware and/or software to execute a hypervisor 520 or other operating system capable of executing workloads associated with applications running on platform 502. In some embodiments, a platform 502 may function as a host platform for one or more guest systems 522 that invoke these applications. Platform 500 may represent any suitable computing environment, such as a high performance computing environment, a datacenter, a communications service provider infrastructure (e.g., one or more portions of an evolved packet core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated to a plurality of hardware resources (e.g., cores and uncores) are monitored and entities (e.g., system management platform 506, hypervisor 520, or other operating system) of computer platform 500 may assign hardware resources of platform logic 510 to perform workloads in accordance with the stress information. For example, system management platform 506, hypervisor 520 or other operating system, or CPUs 512 may determine one or more cores to schedule a workload onto based on the stress information. In some embodiments, self-diagnostic capabilities may be combined with the stress monitoring to more accurately determine the health of the hardware resources. Such embodiments may allow optimization in deployments including network function virtualization (NFV), software defined networking (SDN), or mission critical applications. For example, the stress information may be consulted during the initial placement of virtual network functions (VNFs) or for migration from one platform to another in order to improve reliability and capacity utilization.

Each platform 502 may include platform logic 510. Platform logic 510 comprises, among other logic enabling the functionality of platform 502, one or more CPUs 512, memory 514, one or more chipsets 516, and communication interface 518. Although three platforms are illustrated, computer platform 500 may include any suitable number of platforms. In various embodiments, a platform 502 may reside on a circuit board that is installed in a chassis, rack, or other suitable structure that comprises multiple platforms coupled together through network 508 (which may comprise, e.g., a rack or backplane switch).

CPUs 512 may each comprise any suitable number of processor cores and supporting logic (e.g., uncores). The cores may be coupled to each other, to memory 514, to at least one chipset 516, and/or to communication interface 518, through one or more controllers residing on CPU 612 and/or chipset 516. In particular embodiments, a CPU 612 is embodied within a socket that is permanently or removably coupled to platform 502. CPU 612 is described in further detail below in connection with FIG. 2. Although four CPUs are shown, a platform 502 may include any suitable number of CPUs.

Memory 514 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 514 may be used for short, medium, and/or long term storage by platform 502. Memory 514 may store any suitable data or information utilized by platform logic 510, including software embedded in a computer readable medium, and/or encoded logic incorporated in hardware or otherwise stored (e.g., firmware). Memory 514 may store data that is used by cores of CPUs 512. In some embodiments, memory 514 may also comprise storage for instructions that may be executed by the cores of CPUs 512 or other processing elements (e.g., logic resident on chipsets 516) to provide functionality associated with the manageability engine 526 or other components of platform logic 510. Additionally or alternatively, chipsets 516 may each comprise memory that may have any of the characteristics described herein with respect to memory 514. Memory 514 may also store the results and/or intermediate results of the various calculations and determinations performed by CPUs 512 or processing elements on chipsets 516. In various embodiments, memory 514 may comprise one or more modules of system memory coupled to the CPUs through memory controllers (which may be external to or integrated with CPUs 512). In various embodiments, one or more particular modules of memory 514 may be dedicated to a particular CPU 612 or other processing device or may be shared across multiple CPUs 512 or other processing devices.

In various embodiments, memory 514 may store stress information (such as accumulated stress values associated with hardware resources of platform logic 510 in nonvolatile memory, such that when power is lost, the accumulated stress values are maintained). In particular embodiments, a hardware resource may comprise nonvolatile memory (e.g., on the same die as the particular hardware resource) for storing the hardware resource's accumulated stress value.

A platform 502 may also include one or more chipsets 516 comprising any suitable logic to support the operation of the CPUs 512. In various embodiments, chipset 516 may reside on the same die or package as a CPU 612 or on one or more different dies or packages. Each chipset may support any suitable number of CPUs 512. A chipset 516 may also include one or more controllers to couple other components of platform logic 510 (e.g., communication interface 518 or memory 514) to one or more CPUs. Additionally or alternatively, the CPUs 512 may include integrated controllers. For example, communication interface 518 could be coupled directly to CPUs 512 via integrated IO controllers resident on each CPU.

In the embodiment depicted, each chipset 516 also includes a manageability engine 526. Manageability engine 526 may include any suitable logic to support the operation of chipset 516. In a particular embodiment, manageability engine 526 (which may also be referred to as an innovation engine) is capable of collecting real-time telemetry data from the chipset 516, the CPU(s) 512 and/or memory 514 managed by the chipset 516, other components of platform logic 510, and/or various connections between components of platform logic 510. In various embodiments, the telemetry data collected includes the stress information described herein.

In various embodiments, the manageability engine 526 operates as an out-of-band asynchronous compute agent which is capable of interfacing with the various elements of platform logic 510 to collect telemetry data with no or minimal disruption to running processes on CPUs 512. For example, manageability engine 526 may comprise a dedicated processing element (e.g., a processor, controller, or other logic) on chipset 516 which provides the functionality of manageability engine 526 (e.g., by executing software instructions), thus conserving processing cycles of CPUs 512 for operations associated with the workloads performed by the platform logic 510. Moreover, the dedicated logic for the manageability engine 526 may operate asynchronously with respect to the CPUs 512 and may gather at least some of the telemetry data without increasing the load on the CPUs.

The manageability engine 526 may process telemetry data it collects (specific examples of the processing of stress information will be provided herein). In various embodiments, manageability engine 526 reports the data it collects and/or the results of its processing to other elements in the computer system, such as one or more hypervisors 520 or other operating systems and/or system management software (which may run on any suitable logic such as system management platform 506). In some embodiments, the telemetry data is updated and reported periodically to one or more of these entities. In particular embodiments, a critical event such as a core that has accumulated an excessive amount of stress may be reported prior to the normal interval for reporting telemetry data (e.g., a notification may be sent immediately upon detection).

In various embodiments, a manageability engine 526 may include programmable code configurable to set which CPU(s) 512 a particular chipset 516 will manage and/or which telemetry data will be collected.

Chipsets 516 also each include a communication interface 528. Communication interface 528 may be used for the communication of signaling and/or data between chipset 516 and one or more IO devices, one or more networks 508, and/or one or more devices coupled to network 508 (e.g., system management platform 506). For example, communication interface 528 may be used to send and receive network traffic such as data packets. In a particular embodiment, communication interface 528 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 516 (e.g., manageability engine 526 or switch 530) and another device coupled to network 508. In some embodiments, network 508 may comprise a switch with bridging and/or routing functions that is external to the platform 502 and operable to couple various NICs distributed throughout the computer platform 500 (e.g., on different platforms) to each other. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interface 528 may allow communication of data (e.g., between the manageability engine 526 and the system management platform 506) associated with management and monitoring functions performed by manageability engine 526. In various embodiments, manageability engine 526 may utilize elements (e.g., one or more NICs) of communication interface 528 to report the telemetry data (e.g., to system management platform 506) in order to reserve usage of NICs of communication interface 518 for operations associated with workloads performed by platform logic 510. In some embodiments, communication interface 528 may also allow IO devices integrated with or external to the platform (e.g., disk drives, other NICs, etc.) to communicate with the CPU cores.

Switch 530 may couple to various ports (e.g., provided by NICs) of communication interface 528 and may switch data between these ports and various components of chipset 516 (e.g., one or more Peripheral Component Interconnect Express (PCIe) lanes coupled to CPUs 512). Switch 530 may be a physical or virtual (i.e., software) switch.

Platform logic 510 may include an additional communication interface 518. Similar to communication interface 528, communication interface 518 may be used for the communication of signaling and/or data between platform logic 510 and one or more networks 508 and one or more devices coupled to the network 508. For example, communication interface 518 may be used to send and receive network traffic such as data packets. In a particular embodiment, communication interface 518 comprises one or more physical NICs. These NICs may enable communication between any suitable element of platform logic 510 (e.g., CPUs 512 or memory 514) and another device coupled to network 508 (e.g., elements of other platforms or remote computing devices coupled to network 508 through one or more networks). In particular embodiments, communication interface 518 may allow devices external to the platform (e.g., disk drives, other NICs, etc.) to communicate with the CPU cores. In various embodiments, NICs of communication interface 518 may be coupled to the CPUs through IO controllers (which may be external to or integrated with CPUs 512).

Platform logic 510 may receive and perform any suitable types of workloads. A workload may include any request to utilize one or more resources of platform logic 510, such as one or more cores or associated logic. For example, a workload may comprise a request to instantiate a software component, such as an IO device driver 524 or guest system 522; a request to process a network packet received from a virtual machine 532 or device external to platform 502 (such as a network node coupled to network 508); a request to execute a process or thread associated with a guest system 522, an application running on platform 502, a hypervisor 520 or other operating system running on platform 502; or other suitable processing request.

In various embodiments, platform 502 may execute any number of guest systems 522. A guest system may comprise a single virtual machine (e.g., virtual machine 532*a* or 532*b*) or multiple virtual machines operating together (e.g., a virtual network function (VNF) 534 or a service function chain (SFC) 536). As depicted, various embodiments may include a variety of types of guest systems 522 present on the same platform 502.

A virtual machine 532 may emulate a computer system with its own dedicated hardware. A virtual machine 532 may run a guest operating system on top of the hypervisor 520. The components of platform logic 510 (e.g., CPUs 512, memory 514, chipset 516, and communication interface 518) may be virtualized such that it appears to the guest operating system that the virtual machine 532 has its own dedicated components.

A virtual machine 532 may include a virtualized NIC (vNIC), which is used by the virtual machine as its network interface. A vNIC may be assigned a media access control (MAC) address or other identifier, thus allowing multiple virtual machines 532 to be individually addressable in a network.

In some embodiments, a virtual machine 532*b* may be paravirtualized. For example, the virtual machine 532*b* may include augmented drivers (e.g., drivers that provide higher performance or have higher bandwidth interfaces to underlying resources or capabilities provided by the hypervisor 520). For example, an augmented driver may have a faster interface to underlying virtual switch 538 for higher network performance as compared to default drivers.

VNF 534 may comprise a software implementation of a functional building block with defined interfaces and behavior that can be deployed in a virtualized infrastructure. In particular embodiments, a VNF 534 may include one or more virtual machines 532 that collectively provide specific functionalities (e.g., wide area network (WAN) optimization, virtual private network (VPN) termination, firewall operations, load-balancing operations, security functions, etc.). A VNF 534 running on platform logic 510 may provide the same functionality as traditional network components implemented through dedicated hardware. For example, a VNF 534 may include components to perform any suitable NFV workloads, such as virtualized evolved packet core (vEPC) components, mobility management entities, 3rd Generation Partnership Project (3GPP) control and data plane components, etc.

SFC 536 is group of VNFs 534 organized as a chain to perform a series of operations, such as network packet processing operations. Service function chaining may provide the ability to define an ordered list of network services (e.g. firewalls, load balancers) that are stitched together in the network to create a service chain.

A hypervisor 520 (also known as a virtual machine monitor) may comprise logic to create and run guest systems 522. The hypervisor 520 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 510. Services of hypervisor 520 may be provided by virtualizing in software or through hardware assisted resources that require minimal software intervention, or both. Multiple instances of a variety of guest operating systems may be managed by the hypervisor 520. Each platform 502 may have a separate instantiation of a hypervisor 520.

Hypervisor 520 may be a native or bare-metal hypervisor that runs directly on platform logic 510 to control the platform logic and manage the guest operating systems. Alternatively, hypervisor 520 may be a hosted hypervisor that runs on a host operating system and abstracts the guest operating systems from the host operating system. Various embodiments may include one or more non-virtualized platforms 502, in which case any suitable characteristics or functions of hypervisor 520 described herein may apply to an operating system of the non-virtualized platform.

Hypervisor 520 may include a virtual switch 538 that may provide virtual switching and/or routing functions to virtual machines of guest systems 522. The virtual switch 538 may comprise a logical switching fabric that couples the vNICs of the virtual machines 532 to each other, thus creating a virtual network through which virtual machines may communicate with each other. Virtual switch 538 may also be coupled to one or more networks (e.g., network 508) via physical NICs of communication interface 518 so as to allow communication between virtual machines 532 and one or more network nodes external to platform 502 (e.g., a virtual machine running on a different platform 502 or a node that is coupled to platform 502 through the Internet or other network). Virtual switch 538 may comprise a software element that is executed using components of platform logic 510. In various embodiments, hypervisor 520 may be in communication with any suitable entity (e.g., a SDN controller) which may cause hypervisor 520 to reconfigure the parameters of virtual switch 538 in response to changing conditions in platform 502 (e.g., the addition or deletion of virtual machines 532 or identification of optimizations that may be made to enhance performance of the platform).

Hypervisor 520 may also include resource allocation logic 544 which may include logic for determining allocation of platform resources based on the telemetry data (which may include stress information). Resource allocation logic 544 may also include logic for communicating with various components of platform logic 510 entities of platform 502 to implement such optimization, such as components of platform logic 502. For example, resource allocation logic 544 may direct which hardware resources of platform logic 510 will be used to perform workloads based on stress information.

Any suitable logic may make one or more of these optimization decisions. For example, system management platform 506; resource allocation logic 544 of hypervisor 520 or other operating system; or other logic of platform 502 or computer platform 500 may be capable of making such decisions (either alone or in combination with other elements of the platform 502). In a particular embodiment, system management platform 506 may communicate (using in-band or out-of-band communication) with the hypervisor 520 to specify the optimizations that should be used in order to meet policies stored at the system management platform.

In various embodiments, the system management platform 506 may receive telemetry data from and manage workload placement across multiple platforms 502. The system management platform 506 may communicate with hypervisors 520 (e.g., in an out-of-band manner) or other operating systems of the various platforms 502 to implement workload placements directed by the system management platform.

The elements of platform logic 510 may be coupled together in any suitable manner. For example, a bus may couple any of the components together. A bus may include any known interconnect, such as a multidrop bus, a mesh interconnect, a ring Interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 500 may be coupled together in any suitable manner, such as through one or more networks 508. A network 508 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may comprise any local area network (LAN), wireless local area network (WLAN), metropolitan area network (MAN), intranet, extranet, Internet, wide area network (WAN), virtual private network (VPN), cellular network, or any other appropriate architecture or system that facilitates communications in a network environment. A network can comprise any number of hardware or software elements coupled to (and in communication with) each other through a communications medium. In various embodiments, guest systems 522 may communicate with nodes that are external to the computer platform 500 through network 508.

Figure 6:
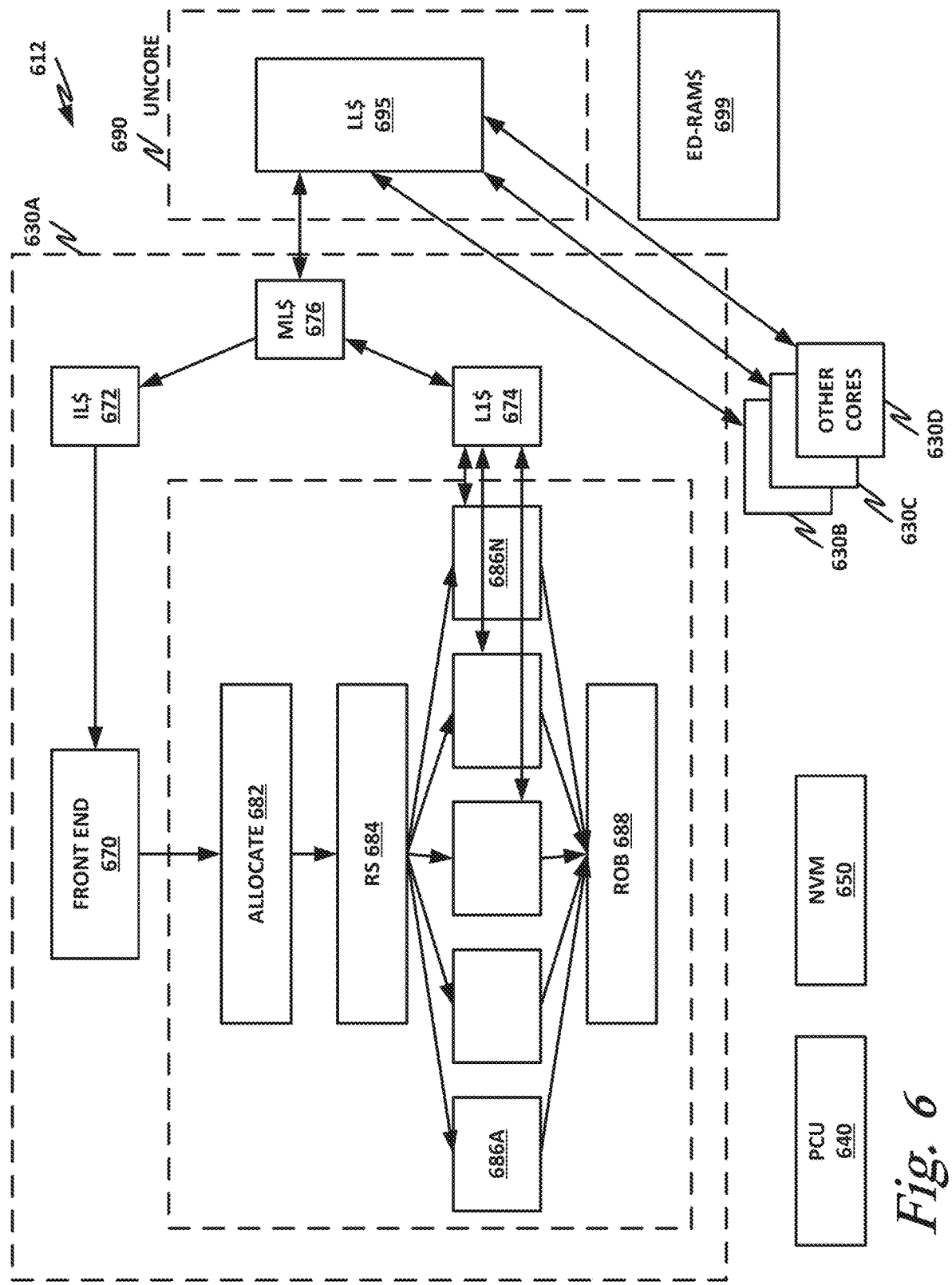
FIG. 6 is a block diagram of a processor according to one or more examples of the present specification.

FIG. 6 illustrates a block diagram of a central processing unit (CPU) 612 in accordance with certain embodiments. Although CPU 612 depicts a particular configuration, the cores and other components of CPU 612 may be arranged in any suitable manner. CPU 612 may comprise any processor or processing device, such as a microprocessor, an embedded processor, a digital signal processor (DSP), a network processor, an application processor, a coprocessor, a system on a chip (SOC), or other device to execute code. CPU 612, in the depicted embodiment, includes four processing elements (cores 630 in the depicted embodiment), which may include asymmetric processing elements or symmetric processing elements. However, CPU 612 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical CPU 612 may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 630A includes an out-of-order processor that has a front end unit 670 used to fetch incoming instructions, perform various processing (e.g. caching, decoding, branch predicting, etc.) and passing instructions/operations along to an out-of-order (OOO) engine 680. OOO engine 680 performs further processing on decoded instructions.

A front end 670 may include a decode module coupled to fetch logic to decode fetched elements. Fetch logic, in one embodiment, includes individual sequencers associated with thread slots of cores 630. Usually a core 630 is associated with a first ISA, which defines/specifies instructions executable on core 630. Often machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. For example, decoders may, in one embodiment, include logic designed or adapted to recognize specific instructions, such as transactional instructions. As a result of the recognition by the decoders, the architecture of core 630 takes specific, predefined actions to perform tasks associated with the appropriate instruction. It is important to note that any of the tasks, blocks, operations, and methods described herein may be performed in response to a single or multiple instructions; some of which may be new or old instructions. Decoders of cores 630, in one embodiment, recognize the same ISA (or a subset thereof). Alternatively, in a heterogeneous core environment, a decoder of one or more cores (e.g., core 630B) may recognize a second ISA (either a subset of the first ISA or a distinct ISA).

In the embodiment depicted, out-of-order engine 680 includes an allocate unit 682 to receive decoded instructions, which may be in the form of one or more micro-instructions or uops, from front end unit 670, and allocate them to appropriate resources such as registers and so forth. Next, the instructions are provided to a reservation station 684, which reserves resources and schedules them for execution on one of a plurality of execution units 686A-686N. Various types of execution units may be present, including, for example, arithmetic logic units (ALUs), load and store units, vector processing units (VPUs), and floating point execution units, among others. Results from these different execution units are provided to a reorder buffer (ROB) 688, which take unordered results and return them to correct program order.

In the embodiment depicted, both front end unit 670 and out-of-order engine 680 are coupled to different levels of a memory hierarchy. Specifically shown is an instruction level cache 672, that in turn couples to a mid-level cache 676, that in turn couples to a last level cache 695. In one embodiment, last level cache 695 is implemented in an on-chip (sometimes referred to as uncore) unit 690. Uncore 690 may communicate with system memory 699, which, in the illustrated embodiment, is implemented via embedded dynamic random access memory (eDRAM). The various execution units 686 within out-of-order engine 680 are in communication with a first level cache 674 that also is in communication with mid-level cache 676. Additional cores 630B-630D may couple to last level cache 695 as well.

In various embodiments, uncore 690 (sometimes referred to as a system agent) may include any suitable logic that is not a part of core 630. For example, uncore 690 may include one or more of a last level cache, a cache controller, an on-die memory controller coupled to a system memory, a processor interconnect controller (e.g., an Ultra Path Interconnect or similar controller), an on-die IO controller, or other suitable on-die logic.

In particular embodiments, uncore 690 may be in a voltage domain and/or a frequency domain that is separate from voltage domains and/or frequency domains of the cores. That is, uncore 690 may be powered by a supply voltage that is different from the supply voltages used to power the cores and/or may operate at a frequency that is different from the operating frequencies of the cores.

CPU 612 may also include a power control unit (PCU) 640. In various embodiments, PCU 640 may control the supply voltages and the operating frequencies applied to each of the cores (on a per-core basis) and to the uncore. PCU 640 may also instruct a core or uncore to enter an idle state (where no voltage and clock are supplied) when not performing a workload.

In various embodiments, PCU 640 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 640 may detect stress characteristics at any suitable interval.

In various embodiments, PCU 640 may comprise a microcontroller that executes embedded firmware to perform various operations associated with stress monitoring described herein. In one embodiment, PCU 640 performs some or all of the PCU functions described herein using hardware without executing software instructions. For example, PCU 640 may include fixed and/or programmable logic to perform the functions of the PCU.

In various embodiments, PCU 640 is a component that is discrete from the cores 630. In particular embodiments, PCU 640 runs at a clock frequency that is different from the clock frequencies used by cores 630. In some embodiments where PCU is a microcontroller, PCU 640 executes instructions according to an ISA that is different from an ISA used by cores 630.

In various embodiments, CPU 612 may also include a nonvolatile memory 650 to store stress information (such as stress characteristics, incremental stress values, accumulated stress values, stress accumulation rates, or other stress information) associated with cores 630 or uncore 690, such that when power is lost, the stress information is maintained.

Figure 7:
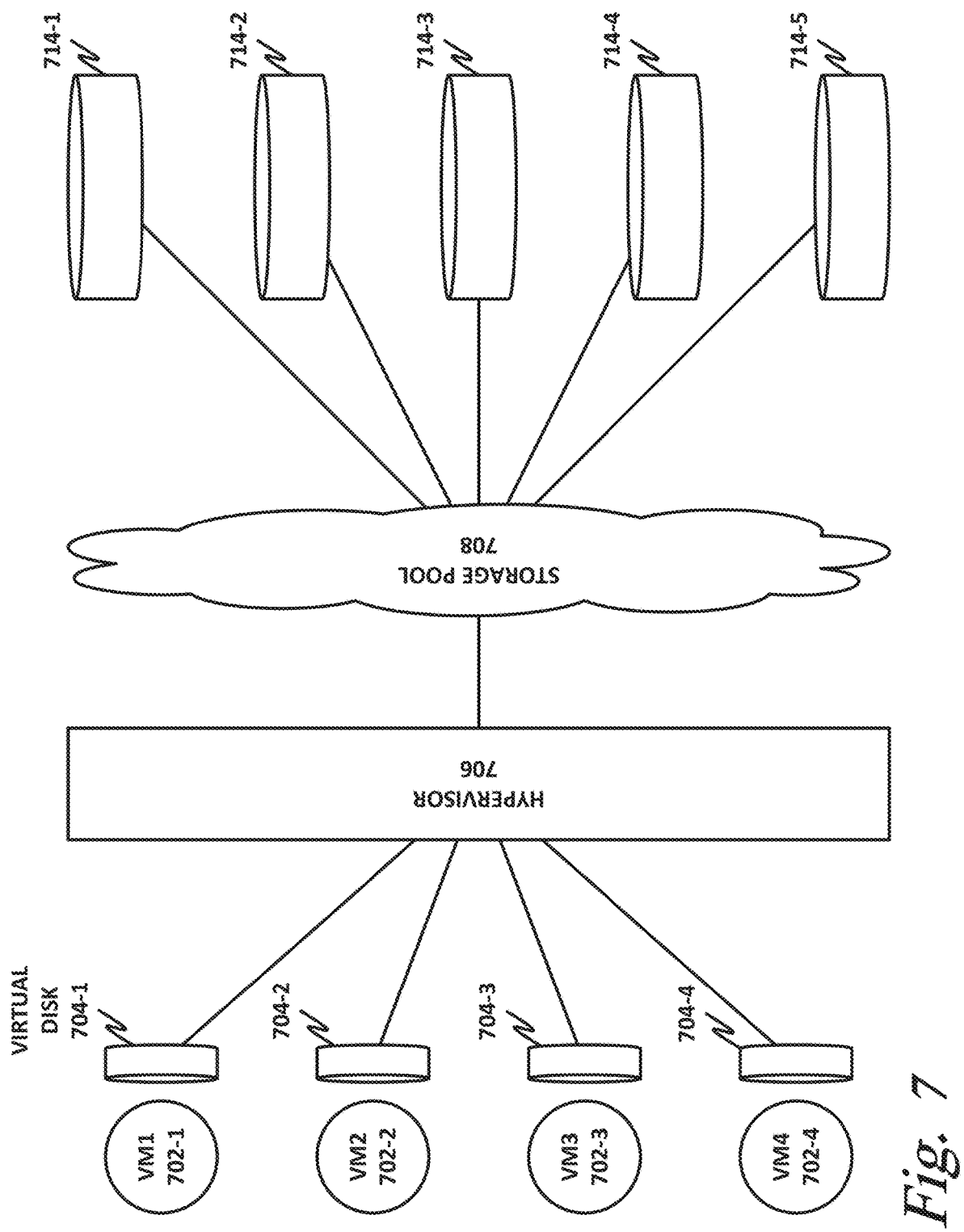
FIG. 7 is a block diagram of a datacenter with pooled storage according to one or more examples of the present specification.

FIG. 7 is a block diagram of a storage architecture according to one or more examples of the present specification. In the example of FIG. 7, a plurality of virtual machines is configured in the datacenter, namely VM 1 702-1, VM 2 702-2, VM 3 702-3, and VM 4 702-4. There is provisioned for each virtual machine 702 a virtual disk 704. Specifically, virtual disk 704-1 is provisioned for VM 1 702-1, virtual disk 704-2 is provisioned for VM 2 702-2, virtual disk 704-3 is provisioned for VM 3 702-3, and virtual disk 704-4 is provisioned for VM 4 702-4.

Virtual disks 704 are not necessarily associated with a particular physical disk, but as described above, represent an allocation of a nominal disk size for the virtual machine. A feature of the datacenter is that if a virtual machine 702 is not using the full capacity of its virtual disk 704, there is no need to consume the full nominal disk size in storage pool 706. Rather, hypervisor 706 may allocate only the necessary resources within storage pool 708.

Storage pool 708 includes a number of physical disks 714-1, 714-2, 714-3, 714-4, and 714-5. From the perspective of a virtual machine 702, with a provisioned virtual disk 704, it does not matter which physical disk 714 the storage space is allocated on. Rather, hypervisor 706 merely ensures that virtual disk 704 has access to sufficient storage resources in storage pool 708.

Furthermore, according to the principles of elastic computing, the nominal size of a virtual disk 704 may be flexible. Virtual disks 704 may grow or shrink according to the needs of a particular application. When the size of a virtual disk 704 changes, hypervisor 706 allocates appropriate resources in storage pool 708.

As discussed above, as the disk usage of a virtual disk 704 changes, or as the nominal size of a virtual disk 704 changes, storage resources may be allocated in noncontiguous blocks on storage pool 708. For example, virtual disk 704-1 may have an initial size of 500 GB. Of that, only 100 GB may be initially used. Storage pool 708 may allocate the full 500 GB on hard disk 714-2, but this may lead to inefficiency. In this case, physical disk 714-2 has 400 GB of allocated space sitting around waiting to be used. It is more efficient to use only as much space as necessary to meet the current demand, and as storage pool 708 approaches capacity, to simply add more physical disks 714 to handle the increased demand. In other words, it is possible that the total size of allocated virtual disks 704 may exceed the actual capacity of physical disks 714 if the virtual machines are not using their full nominal capacity. As virtual machines 702 use more of the allocated space on their respective virtual disks 704, additional storage resources may be provided in storage pool 708, and additional physical drives 714 may be added.

While a modern datacenter is well-equipped to handle these circumstances, this method can lead to inefficiencies. Specifically, as noncontiguous blocks of disk space are allocated, IO operations from a particular virtual disk 704 may be directed to different physical disks. Furthermore, a plurality of virtual disks 704 may be trying to access the same physical disk 714 at the same time.

For example, consider the case where a VM has a 10 Mb file open for writing and editing. Once the writing and editing are done, the user closes the file, and the file is written to disk. However, the 10 Mb parent IO operation may then be broken up into several sub-IOs. For example, the file may be spread across three noncontiguous blocks on three different physical disks 714 of storage pool 708. These may be broken down into several different small blocks, and written out to the various disks.

Figure 8:
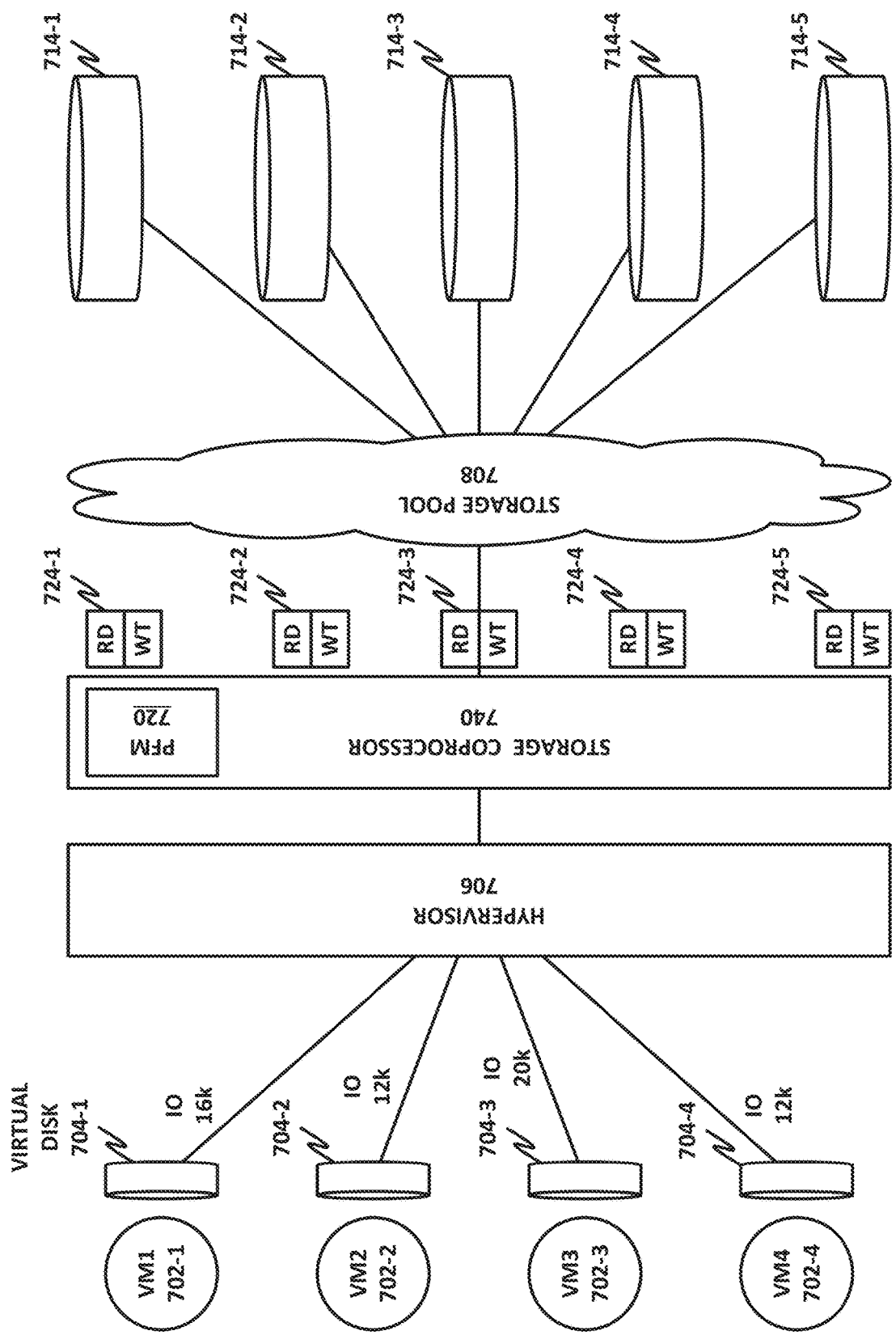
FIG. 8 is a block diagram of a datacenter with pooled storage according to one or more examples of the present specification.

FIG. 8 illustrates an improvement of the system of FIG. 7 in which a storage coprocessor 740 provides greater IO operation efficiency.

As before, a plurality of virtual machines 702 have allocated to them a plurality of virtual disks 704, and the virtual disks 704 issue parent IO operations that are directed by hypervisor 706 to a storage pool 708 including a plurality of physical disks 714. Note that storage pool 708 may be local the datacenter, or it may be a remoted storage pool. For example, a virtual machine 702 may be hosted in a San Francisco datacenter, and may be accessing a storage pool 708 that is co-located in that same San Francisco datacenter, or that is located in a separate offsite datacenter in, for example, Austin, Tex.

In this case, a storage coprocessor 740 is provided in the datacenter. As described above, storage coprocessor 740 may be any appropriate type of processor, including an ASIC, FPGA, programmable processor, or any other logic device configured to carry out the operations of storage coprocessor 740. In cases where an ASIC, FPGA, or similar is used, further advantages are realized by operating storage coprocessor 740 at hardware speeds.

In some cases, storage coprocessor 740 may also include a persistent fast memory 720, or other local nonvolatile memory block. Persistent fast memory 720 may be, for example, an Intel® 3G Crosspoint memory, which provides random access memory at or near the speed of traditional dynamic RAM, but that is also persistent in the sense that if power is removed, persistent fast memory 720 retains its data indefinitely. Note that persistent fast memory 720 may be locally hosted with storage coprocessor 740 in some examples. In other examples, persistent fast memory 720 may be provided by a dedicated memory server, such as a dedicated 3-D Crosspoint server. In cases where persistent fast memory 720 is provided by a memory server, memory operations may not achieve persistence until storage coprocessor 740 receives an acknowledgment (ACK) that the data have been stored in the persistent fast memory 720.

In this example, storage coprocessor 740 allocates a queue 724 for each physical disk 714. This queue may include both a read queue and a write queue. In this example, queue 724-1 is allocated to disk 714-1, queue 724-2 is allocated to disk 714-2, queue 724-3 is allocated to disk 714-3, queue 724-4 is allocated to disk 714-4, and queue 724-5 is allocated to disk 714-5.

As illustrated in this example, virtual disk 704-1 may issue a 16 kB IO operation, virtual disk 704-2 may issue a 12 kB IO operation, virtual disk 704-3 may issue a 20 kB IO operation, and virtual disk 704-4 may issue a 12 kB IO operation. These various IO operations are to illustrate the heterogeneous nature of the IOs that may occur in the datacenter.

As hypervisor 706 receives parent IO operations from virtual disks 704, the requests are not routed directly to storage pool 708 for access to physical disks 714. Rather, hypervisor 706 receives these various parent IO operations, and routes them to storage coprocessor 740. Storage coprocessor 740 does not send these directly to storage pool 708, but rather queues each IO operation up into the appropriate queue for the target physical disk 714. Once a queue 724 is full, the queue is flushed to or from the physical disk 714.

For example, if queue 724-1 has a size of 128 kB for both read and write, then once 128 kB of read operations are accumulated in the read queue, the queue is flushed out to disk 714-1, the data are read and returned, and storage coprocessor 740 returns the data to the various virtual disks 704 that have issued the parent read operations.

Similarly, for the write queue of queue 724-1, storage coprocessor 740 accumulates write operations until 128 kB of write data are accumulated, and then write queue 724-1 is flushed out to disk 714-1, and the data are written to the disk.

Note that in certain operations, the queue may be flushed before it is full. For example, a timer may be associated with each queue as well, and if the timer expires, the queue is flushed regardless of whether the queue is full. This can ensure that the queue itself does not become a bottleneck in the IO operations.

Also note that in this example, the read queue and write queue both have a uniform size of 128 kB, which is a nonlimiting and illustrative example. However, the read queue and write queue need not have the same size.

In a general sense, storage coprocessor 740 allocates the size of each queue 724 according to the attributes and characteristics of its corresponding physical disk 714. Thus, storage coprocessor 740 may determine the optimal size for a queue 724 by reading the attributes of disk 714, and crafting a queue size that is appropriate to that disk. This allocation need not be a static allocation. Rather, storage coprocessor 740 may monitor the performance of each disk 714, and may dynamically allocate the size of queues to ensure that the disks are functioning efficiently. When a new physical disk 714 is added to storage pool 708, storage coprocessor 740 may allocate an appropriately-sized queue, and may then monitor the queue as with the other disks, to ensure that the queue size maintains optimal efficiency.

Advantageously, storage coprocessor 740 handles all IOs from all virtual machines as a whole rather than handling the IOs from each separate VM as a separate entity. The parent IO from one virtual machine may include several real sub-IOs on the physical device based on fine-grained space management by hypervisor 706. To optimize the IOs, storage coprocessor 704 handles the IOs quickly, with awareness of the target device's optimal block size.

To do this, as discussed above, storage coprocessor 740 creates read and write queues 724 for each physical drive 714, and then accepts the real sub-IOs from the virtual machines uniformly, without needing to be aware of which parent IO came from which VM 702. Newly-arrived IOs are checked and merged into one single larger IO, whose size is automatically and dynamically assigned by SCP 740, based on each device's properties such as preferred block size, SSD endurance, and amplification. Once the queue is full, the IO is sent to the target device.

Advantageously, for the user of SCP 740, not only is IO efficiency optimized, but the CPU's interaction with back-end physical devices can be offloaded to SCP 740.

In a usage example, storage pool 708 may include a number of SSD drives 714. These are especially useful for latency-sensitive applications. SCP 740 can optimize sub-IOs to ensure optimal usage of bandwidth and optimal endurance of the SSD.

By way of example, the parent IO from a virtual machine 702 may be 16 kB, and hypervisor 706 may split that into four 4 kB units, which may go to one or more physical disks. Data protection technologies like redundant array of independent disks (RAID) and erasure coding may drive the block size in certain existing systems. So when hypervisor 706 is handling data operations, the block size may be suboptimal for the preferred block size for the SSD, which may be much larger, such as 128 kB. This block size is selected by the SSD to optimize for write and space amplification. Thus, writing a large number of 4 kB blocks to the SSD may be suboptimal and may decrease endurance. Manually realigning hypervisor 706 to a larger block size (e.g., 128 kB) is also suboptimal, as some of the writes may still result in small data blocks (e.g., a write is split among several disks). Furthermore, different SSDs may have different preferred block sizes, so hypervisor 706 may at best be able to compromise and select a block size that works "pretty well" for all SSDs in the datacenter.

But by employing SCP 740 of the present specification, the need for compromise is eliminated. SCP 740 can identify an optimal block size for each disk 714, and establish separate read and write queues for each. This can also eliminate the problem of highly-mixed read and write operations, which interfere with each other's efficiency. In this case, reads and writes are queued separately, and are sent only when a sufficient block has been accumulated. Thus, a large number of 4 kB blocks may be received from some number of VMs 702. SCP 740 aggregates these without the need to know which machine originated which IO. Rather, SCP 740 simply builds a block of optimal size, at hardware speeds, including linking continuous IOs, linking overlapped read IOs, inserting holes (zeroes) for adjacent and noncontiguous IOs, and zero padding (front or rear) as necessary to build the appropriate data structure. SCP 740 then efficiently hands the large IO block off to SSD 714.

In another operational example, SCP 740 may improve the datacenter's flexibility to scale up or down for the elastic cloud environments, while maintaining low latency As mentioned above, the elastic could provide two benefits: one is flexibility of scale up and down, including the storage, and the other is consistent low-latency IO performance. Sometimes these two benefits can hardly be achieved with the current solutions due to the nature of dynamic and runtime space management by the VMM.

Without SCP 740, when storage on one VM 702 is scaled up in the elastic cloud environment, hypervisor 706 maps additional space from shared storage pool 708 to that VM. Because hypervisor 706 provides fine-grained space management, that new space allocation may be discrete and noncontiguous from the previous mapping. When a new SSD 714 is added to the storage pool, hypervisor 706 formats it into, for example, 4 kB units, and maps those allocations in the shared storage pool. When an SSD 714 is removed from the storage pool (e.g., in the case of a physical drive failure), its storage allocations are remapped to other SSDs 714. Thus, in a real-world datacenter, it is often not realistic to expect VD 704 of a particular VM 702 to be contiguous on a single drive 714.

But with SCP 740 deployed in the datacenter, contiguous mapping is not necessary to realize read and write optimization. All IOs from all VMs can be continuously optimized.

As illustrated herein, all IOs directed to a particular SSD 714 are first sent to the read and write queues that SCP 740 has allocated for the disk. Once an IO arrives in the queue 724, SCP 740 can inspect the IO at hardware speed to find adjacent or overlapped IOs based on logical block addresses. The merged IO is then placed in the internal memory of SCP 740, along with properties such as the IO type and target device. Once the IO accumulates to the preferred size, SCP 740 moves the single accumulated IO to the device's hardware queue for processing. SCP 740 may also insert, prepend, or append zeroes as necessary to eliminate the SSD's internal mechanisms, such as write amplification, to handle the IO as fast as possible.

Queues may also be flushed by a timeout, or driven by an interrupt or a polling mechanism. Once SCP 740 receives the IO interrupt or polling signal, it may provide the IOs with previously-saved IO properties and then update SCP 740's allocated read or write queues.

Note that the optimal queue size may depend not only on the block size of a disk, but also on factors like write endurance. For example, solid state drives (SSDs) generally have a limited number of write cycles (endurance). In one embodiment, an individual cell may be expected to tolerate on the order of $10^5$ to $10^6$ write cycles before wearing out. This can be an important optimization, as many datacenters use SSDs in their storage pools to increase read and write speeds.

In cases where storage coprocessor 740 is provisioned with a persistent fast memory 720 or other local nonvolatile memory, additional advantages can be realized. For example, a virtual disk 704-1 may issue a parent write operation that is routed to storage coprocessor 740. Storage coprocessor 740 may queue the write operation up into the appropriate write queue 724, and may also log the transaction to persistent fast memory 720. In this case, storage coprocessor 740 can now return an ACK to the virtual disk 704 without having actually written to storage pool 708. Because the data were stored in persistent fast memory 720, the data have achieved persistence. Once the queue is full and the write is flushed, storage coprocessor 740 may remove the cached data from persistent fast memory 720. In the event that storage coprocessor 740 suffers a power loss, then when power is restored, storage coprocessor 740 reads the data from persistent fast memory 720 and completes the appropriate write operation to the appropriate physical disk 714.

Figure 9:
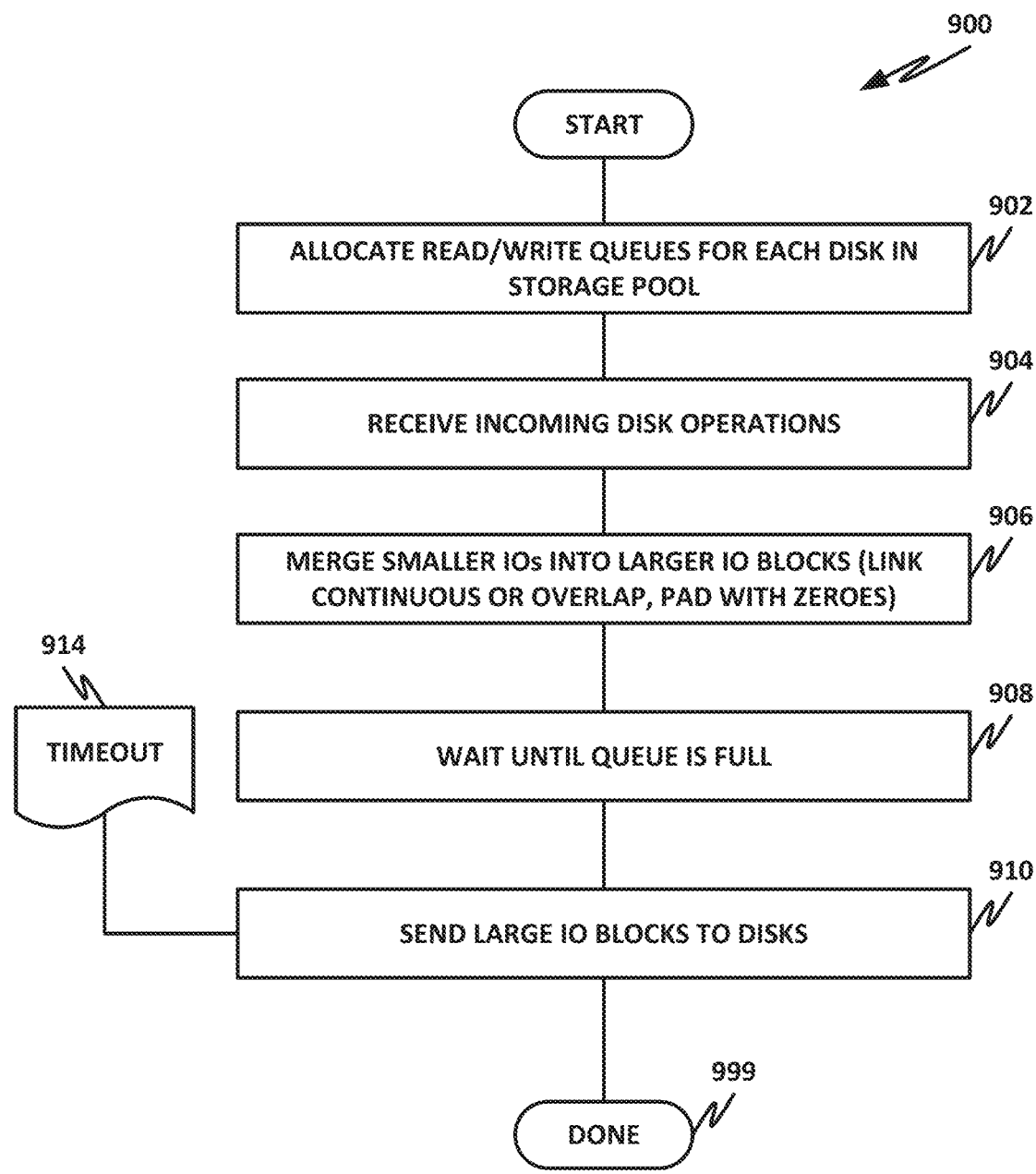
FIG. 9 is a flow chart of a method of handling merged IO operations according to one or more examples of the present specification.

FIG. 9 is a flowchart of a method 900 of performing merged input/output operations according to one or more examples of the present specification. In the example of method 900, in block 902, storage coprocessor 740 allocates read and write queues for each disk in storage pool 708 as described in the preceding figures.

In block 904, storage coprocessor 740 receives incoming disk operations representing parent IO operations from virtual disks 704.

In block 906, storage coprocessor 740 merges smaller IOs into larger IO blocks. These blocks may be linked continuously or may overlap, and in appropriate cases may be padded with zeros.

In block 908, storage coprocessor 740 sends the large IO blocks to the appropriate physical disk 714.

In block 910, storage coprocessor 740 waits until the queue is full, then flushes the IO blocks out to disk. [Needs Review to Coincide with Figures]

In block 999, the method is done.

Note that in certain cases, a timeout 914 may occur, which short-circuits the weight block 908, and causes a flush immediately.

In block 999, the method is done.

Figure 10:
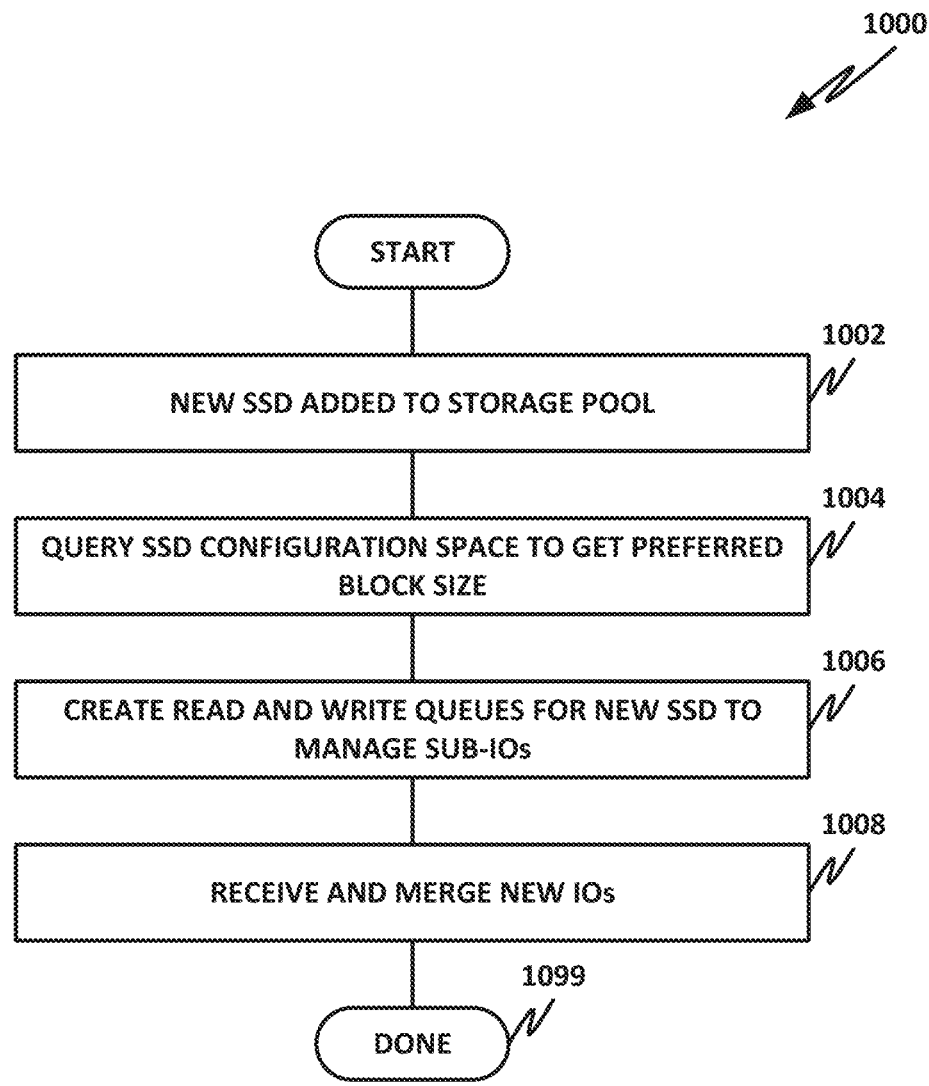
FIG. 10 is a flow chart of a method of adding a new disk according to one or more examples of the present specification.

FIG. 10 is a flow chart of a method that an SCP may perform upon addition of a new hard drive, such as an SSD, according to one or more examples of the present specification.

In block 1002, a new SSD (or other drive) is added to the storage pool, such as storage pool 708 of FIG. 7.

In bock 1004, the SCP queries the configuration space of the new SSD to determine information such as the preferred block size for the disk. It may also query other sources to gather relevant information, such as a database with information about the endurance of the SSD, which will allow the SCP to craft an optimal storage solution.

In block 1006, the SCP creates read and write queues for the new SSD, which will be used to manage future incoming sub-IOs.

In block 1008, the SCP begins receiving new IOs directed to the new disk. It begins filling queues as described herein, and continues managing the IOs according to the methods of the present specification.

In block 1099, the method is done.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field programmable gate arrays (FPGAs), and other semiconductor chips.

Note also that in certain embodiments, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, nontransitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms 'memory' and 'storage,' as appropriate. A nontransitory storage medium herein is expressly intended to include any nontransitory special-purpose or programmable hardware configured to provide the disclosed operations, or to cause a processor to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions Implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

There is disclosed in one example, a computing apparatus, comprising: a data interface to communicatively couple to a storage pool comprising a plurality of disks; a virtual machine manager comprising a processor; and a storage coprocessor (SCP) to: create a read queue and write queue for the disks in the storage pool; receive an input/output (IO) operation from a virtual machine, the IO operation directed to a storage address located on a disk in the storage pool; and add the IO operation to the queue for the disk.

There is also disclosed an example, wherein the SCP comprises a field-programmable gate array.

There is also disclosed an example, wherein the SCP comprises an application-specific integrated circuit.

There is also disclosed an example, wherein the SCP comprises a microprocessor, and a storage medium having instructions for providing an SCP function.

There is also disclosed an example, wherein the SCP is to determine that a timeout has expired, and to flush the queue for the disk.

There is also disclosed an example, wherein the SCP is to determine that the queue is full, and flush the queue.

There is also disclosed an example, wherein the SCP is to dynamically optimize the read and write queue of a disk based at least in part on a property of the disk.

There is also disclosed an example, wherein the property is a block size of the disk.

There is also disclosed an example, wherein the property is a write endurance of the disk.

There is also disclosed an example, wherein the SCP is to dynamically optimize with the disk live.

There is also disclosed an example, wherein the SCP is to dynamically receive the property from the disk.

There is also disclosed an example, wherein the storage pool is a remote networked storage.

There is also disclosed an example, wherein the SCP comprises a nonvolatile storage, and wherein the SCP is to provide an immediate acknowledgement of a write operation.

There is also disclosed an example of a storage coprocessor (SCP) for a virtual machine manager, comprising logic to: communicatively couple to a storage pool comprising a plurality of disks; create a read queue and write queue for the disks in the storage pool; receive an input/output (IO) operation from a virtual machine, the IO operation directed to a storage address located on a disk in the storage pool; and add the IO operation to the queue for the disk.

There is also disclosed an example, comprising a field-programmable gate array.

There is also disclosed an example, comprising an application-specific integrated circuit.

There is also disclosed an example, comprising a microprocessor, and a storage medium having instructions for providing at least part of the logic.

There is also disclosed an example, wherein the logic is to determine that a timeout has expired, and to flush the queue for the disk.

There is also disclosed an example, wherein the logic is to determine that the queue is full, and flush the queue.

There is also disclosed an example, wherein the logic is to dynamically optimize the read and write queue of a disk based at least in part on a property of the disk.

There is also disclosed an example, wherein the property is a block size of the disk.

There is also disclosed an example, wherein the property is a write endurance of the disk.

There is also disclosed an example, wherein the logic is to dynamically optimize with the disk live.

There is also disclosed an example, wherein the logic is to dynamically receive the property from the disk.

There is also disclosed an example of a method of managing a storage pool, comprising: communicatively coupling to a storage pool comprising a plurality of disks; creating a read queue and write queue for the disks in the storage pool; receiving an input/output (IO) operation from a virtual machine, the IO operation directed to a storage address located on a disk in the storage pool; and adding the IO operation to the queue for the disk.

There is also disclosed an example, further comprising determining that a timeout has expired, and to flush the queue for the disk.

There is also disclosed an example, further comprising determining that the queue is full, and to flush the queue.

There is also disclosed an example, further comprising dynamically optimizing the read and write queue of a disk based at least in part on a property of the disk.

There is also disclosed an example, wherein the property is a block size of the disk.

There is also disclosed an example, wherein the property is a write endurance of the disk.

There is also disclosed an example, further comprising dynamically optimizing with the disk live.

There is also disclosed an example, further comprising dynamically receiving the property from the disk.

There is also disclosed an example, wherein the storage pool is a remote networked storage.

There is also disclosed an example, further comprising caching a write operation to a nonvolatile storage, and providing an immediate acknowledgement of the write operation.

There is also disclosed an example of one or more tangible, nontransitory computer-readable storage mediums having stored thereon executable instructions for carrying out the method.

An apparatus comprising means for performing the method.

There is also disclosed an example, wherein the means comprise a storage coprocessor.

There is also disclosed an example, wherein the storage coprocessor is an application-specific integrated circuit.

There is also disclosed an example, wherein the storage coprocessor is a field-programmable gate array.

There is also disclosed an example, wherein the storage coprocessor is a programmable processor.

What is claimed is:

1. A computing apparatus, comprising:
   a data interface to communicatively couple to a storage pool comprising a plurality of physical storage devices; and
   circuitry to:
      create device-specific read queue and write queues for the physical storage devices in the storage pool;
      receive a first input/output (IO) operation from a virtual machine, the IO operation directed to a storage address located on a physical storage device in the storage pool;
      add the first IO operation to a device-specific queue for the physical storage device;
      receive a second IO operation from the same or a different virtual machine, the second IO operation directed to a storage address located on the physical storage device;
      add the second IO operation to the device-specific queue for the physical storage device;
      merge the first IO operation and second IO operation into a merged TO operation; and
      send the merged IO operation to the physical storage device.

2. The computing apparatus of claim 1, wherein the circuitry comprises a field-programmable gate array.

3. The computing apparatus of claim 1, wherein the circuitry comprises a microprocessor, and a storage medium having instructions for providing an SCP function.

4. The computing apparatus of claim 1, wherein the circuitry is to determine that a timeout has expired, and to flush the queues for the physical storage device.

5. The computing apparatus of claim 1, wherein the circuitry is to determine that the queues are full, and flush the queues.

6. The computing apparatus of claim 1, wherein the circuitry is to dynamically optimize the device-specific read queue and write queues of a disk based at least in part on a property of the disk.

7. The computing apparatus of claim 6, wherein the property is a block size of the disk.

8. The computing apparatus of claim 6, wherein the property is a write endurance of the disk.

9. The computing apparatus of claim 6, with the circuitry is to dynamically optimize with the disk live.

10. The computing apparatus of claim 6, wherein the circuitry is to dynamically receive the property from the disk.

11. The computing apparatus of claim 1, wherein the storage pool is a remote networked storage.

12. The computing apparatus of claim 1, wherein the circuitry comprises a nonvolatile storage, and wherein the circuitry is to provide an immediate acknowledgement of a write operation.

13. The computing apparatus of claim 1, wherein the circuitry is further to aggregate IO operations from a plurality of virtual machines into the device-specific queue.

14. A storage coprocessor (SCP), comprising circuitry to:
   communicatively couple to a storage pool comprising a plurality of physical storage devices;
   create device-specific read queue and write queues for the physical storage devices in the storage pool;
   receive a first input/output (IO) operation from a virtual machine, the TO operation directed to a storage address located on a physical storage device in the storage pool;
   receive a second IO operation from the same or a different virtual machine, the second IO operation directed to a storage address located on the physical storage device;
   add the first and second IO operations to a device-specific queue for the physical storage device;
   merge the first IO operation and second IO operation into a merged TO operation; and send the merged IO operation to the physical storage device.

15. The SCP of claim 14, wherein the circuitry is to determine that a timeout has expired, and to flush the queues for the physical storage device.

16. The SCP of claim 14, wherein the circuitry is to determine that the queues are full, and flush the queues.

17. The SCP of claim 14, wherein the circuitry is to dynamically optimize the device-specific read queue and write queues of a disk based at least in part on a property of the physical storage device.

18. The SCP of claim 17, wherein the property is a block size of the physical storage device.

19. The SCP of claim 17, wherein the property is a write endurance of the physical storage device.

20. The SCP of claim 17, wherein the circuitry is to dynamically receive the property from the physical storage device.

21. The SCP of claim 14, wherein the circuitry is further to aggregate IO operations from a plurality of virtual machines into the device-specific queue.

22. A method of managing a storage pool, comprising:
communicatively coupling to a storage pool comprising a plurality of physical storage devices;
creating device-specific read queue and write queues for the physical storage devices in the storage pool;
receiving a first input/output (IO) operation from a virtual machine, the TO operation directed to a storage address located on a physical storage device in the storage pool;
receiving a second IO operation from the same or a different virtual machine, the IO operation directed to a storage address located on the physical storage device;
adding the first and second IO operations to a device-specific storage pool for the physical storage device;
merging the first and second IO operations into a merged IO operation; and
sending the merged IO operation to the physical storage device.

23. The method of claim 22, further comprising aggregating TO operations from a plurality of virtual machines into the device-specific queue.

* * * * *

UNITED STATES PATENT AND TRADEMARK OFFICE
CERTIFICATE OF CORRECTION

PATENT NO. : 11,327,789 B2
APPLICATION NO. : 16/478549
DATED : May 10, 2022
INVENTOR(S) : Gang Cao et al.

It is certified that error appears in the above-identified patent and that said Letters Patent is hereby corrected as shown below:

On the Title Page

Under Item (56), "Primary Examiner", in Column 2, Line 1, delete "Nan H Nguyen" and insert -- Van H Nguyen --, therefor.

In the Claims

In Column 34, Claim 1, Line 14, delete "TO operation;" and insert -- IO operation; --, therefor.

In Column 34, Claim 9, Line 38, delete "with" and insert -- wherein --, therefor.

In Column 34, Claim 14, Line 59, delete "TO operation" and insert -- IO operation --, therefor.

In Column 34, Claim 14, Line 67, delete "TO operation;" and insert -- IO operation; --, therefor.

In Column 36, Claim 22, Line 7, delete "TO operation" and insert -- IO operation --, therefor.

In Column 36, Claim 23, Line 19, delete "TO operations" and insert -- IO operations --, therefor.

Signed and Sealed this
Twenty-third Day of May, 2023

Katherine Kelly Vidal
*Director of the United States Patent and Trademark Office*